(12) United States Patent
Greenboim et al.

(10) Patent No.: US 12,556,831 B2
(45) Date of Patent: Feb. 17, 2026

(54) SYSTEM FOR AUTOMATED DETECTION OF THE STROBOSCOPIC EFFECT

(71) Applicant: IoT Technologies LLC, La Jolla, CA (US)

(72) Inventors: Abraham Greenboim, La Jolla, CA (US); Osama Mustafa, London (GB)

(73) Assignee: IoT Technologies LLC, La Jolla, CA (US)

( * ) Notice: Subject to any disclaimer, the term of this patent is extended or adjusted under 35 U.S.C. 154(b) by 0 days.

(21) Appl. No.: 18/769,221

(22) Filed: Jul. 10, 2024

(65) Prior Publication Data

US 2026/0019719 A1     Jan. 15, 2026

(51) Int. Cl.
*H04N 23/95* (2023.01)
*G06T 7/246* (2017.01)
(Continued)

(52) U.S. Cl.
CPC ............. *H04N 23/95* (2023.01); *G06T 7/248* (2017.01); *G06V 10/145* (2022.01); *G06V 10/70* (2022.01);
(Continued)

(58) Field of Classification Search
CPC ........ H04N 23/95; H04N 23/84; G06T 7/248; G06T 2207/10016; G06V 10/145; G06V 10/70
See application file for complete search history.

(56) References Cited

U.S. PATENT DOCUMENTS 5,018,213 A   5/1991 Sikes
5,041,905 A   8/1991 Hatanaka et al.
(Continued)

FOREIGN PATENT DOCUMENTS

CN    112557408 A    3/2021
KR    20180083314 A    7/2018

OTHER PUBLICATIONS

Official Action mailed Oct. 18, 2024 in U.S. Appl. No. 18/769,249, 7 pages.
(Continued)

*Primary Examiner* — Shahbaz Nazrul
(74) *Attorney, Agent, or Firm* — Buchalter LLP

(57) ABSTRACT

A stroboscopic device, comprising: a camera for acquiring video frames; a light source; and at least one hardware processor; and software that is configured to, when executed by the at least one hardware processor, acquire a sequence of video frames via the camera, convert the frames from RGB to grayscale, for a first and second frame in the sequence of video frames, compute the dense optical flow field between the two frames, wherein the optical flow field contains a flow vector for each pixel in each of the first and second frames, indicating the motion of that pixel from the first frame to the second frame, calculate the average magnitude (Average Optical Flow or AOF) of all flow vectors for each pixel in the first and second frames, compare the AOF to a threshold, and store a result based on the comparison, repeat the process for all frames in the sequence of video frames, determine whether a stroboscopic effect has been achieved based on the store results, control the activation of the light source until the results indicate that the stroboscopic effect has been achieved, control the activation of the light source until the results indicate that the stroboscopic effect has been achieved, and obtain a further sequence of video frames after the stroboscopic effect is achieved, identify an object in the further sequence of video frames, and automatically detect movement or vibration of the identified object.

19 Claims, 10 Drawing Sheets

(51) Int. Cl.
*G06V 10/145* (2022.01)
*G06V 10/70* (2022.01)
*H04N 23/84* (2023.01)

(52) U.S. Cl.
CPC ... *H04N 23/84* (2023.01); *G06T 2207/10016* (2013.01)

(56) References Cited

U.S. PATENT DOCUMENTS

| | | |
|---|---|---|
| 5,043,904 A | 8/1991 | Sikes et al. |
| 6,026,172 A | 2/2000 | Lewis, Jr. et al. |
| 8,505,382 B2 | 8/2013 | Datskos et al. |
| 8,988,061 B2 | 3/2015 | Datskos et al. |
| 10,499,803 B2 | 12/2019 | Bos et al. |
| 12,025,634 B2 | 7/2024 | Lortie |
| 12,118,711 B2 | 10/2024 | Lortie |
| 12,283,081 B1 * | 4/2025 | Greenboim ............. G06N 3/04 |
| 2015/0294499 A1 | 10/2015 | Wagner et al. |
| 2017/0182406 A1 * | 6/2017 | Castiglia ............... A63F 13/213 |
| 2019/0226972 A1 * | 7/2019 | Javidi .................. G06T 7/0012 |
| 2021/0074045 A1 | 3/2021 | Negro et al. |
| 2022/0404384 A1 | 12/2022 | Lortie |
| 2022/0417590 A1 * | 12/2022 | Jiao ....................... G06V 20/52 |
| 2024/0046485 A1 * | 2/2024 | Ramanathan ......... G06V 10/82 |

OTHER PUBLICATIONS

International Search Report and Written Opinion for International Application No. PCT/US2025/036247, dated Oct. 19, 2025, 12 pages.

\* cited by examiner

SYSTEM FOR AUTOMATED DETECTION OF THE STROBOSCOPIC EFFECT

TECHNICAL FIELD

The embodiments described herein are generally directed to stroboscopic effect detection systems, and more particularly to, systems for automated detection of the stroboscopic effect.

BACKGROUND

Stroboscopes play a critical role in various industrial applications, such as the inspection of fast-moving belts and machinery, with high-frequency movements. Stroboscopes are devices used to make a high frequency, cyclically moving object appear slow-moving or stationary, primarily by illuminating it at intervals. The automation and precision at a work site is a major concern. The inability to perceive these high-frequency movements with the naked eye underscores the importance of using tools like stroboscopes, which can "freeze" or slow down the motion to a visually observable speed, or other vibration analysis equipment that can measure and interpret these frequencies for maintenance, diagnostic, and quality control purposes. Unfortunately, despite the high-value applications of stroboscopes, conventional procedures for using them are manual, which is not optimal for inspection automation of fast-moving objects. For example, conventional inspection procedures require that the system under inspection be prevented from operation until the inspection is complete, which is costly in terms of time and finances.

Further, automated processing, e.g., using a cloud based system, would be advantages, but creates additional issues. Processing on the cloud requires executing computational tasks, such as running applications, analyzing data, or performing calculations, using remote computing resources provided by a cloud service provider. When a hardware device depends on a cloud-based service, it increases the time it takes to complete an operation. but such stroboscope inspection applications require real-time operation, and as such a highly critical requirement is less latency.

As previously stated, stroboscopes play a critical role in various industrial applications, such as the inspection of fast-moving belts and machinery and quality inspection. Conventional inspection requires that the system under inspection be prevented from operation until the inspection is complete, which is costly in terms of time and finances. Further, most current solutions involve invasive procedures and operate with intervention in the machine operation as it requires contact with the system under inspection.

Conventional stroboscopes are effective for visualizing motion and vibrations but are not suitable for all types of equipment or failure modes. Their use is typically limited to rotating or reciprocating machinery; however, existing stroboscope effectiveness is limited to equipment with repetitive, predictable motion patterns, making existing stroboscopes unsuitable for detecting irregular or complex failure modes in more diverse systems. Additionally, conventional stroboscopes rely on stable power sources and require a clear line of sight, further restricting their applicability in certain environments.

Effective use of a conventional stroboscope requires skilled operators who can interpret the visual data correctly. Misinterpretation can lead to incorrect conclusions about the health of the equipment. Further, the visual inspection process can be subjective, depending on the observer's experience and judgment, leading to inconsistencies and potential errors in maintenance predictions.

In addition to the human factor during conventional stroboscope use, such conventional stroboscopes provide visual data but lack the detailed quantitative data that other predictive maintenance tools, such as vibration analysis or thermal imaging, can offer. This limits their ability to predict issues accurately. Other factors such as environment and climate can affect the quality of data. Stroboscopes may not work effectively in all environments, especially those with poor lighting or where reflective surfaces can interfere with one or more LED lights.

Conventional stroboscopes are typically used intermittently, which means they may miss transient issues or changes in machine behavior that occur between inspections. Moreover, conventional stroboscope data can be inaccurate due to various factors such as improper synchronization with the equipment's motion, ambient lighting conditions, or mechanical vibrations affecting the visibility of the moving parts. If such a conventional stroboscope's frequency is not correctly adjusted to match the machinery's speed, it can lead to distorted or blurred images, making it difficult to interpret the motion accurately. Additionally, unlike continuous monitoring systems, conventional stroboscopes do not provide historical data, which is essential for trend analysis and predicting future failures. Finally, as a result of the current state of technology around conventional stroboscopes, proximity to machinery and target readings can create safety hazards to operators.

While conventional stroboscopes can be valuable tools for certain types of predictive maintenance, these limitations highlight the need to complement them with other diagnostic and monitoring technologies to ensure a comprehensive maintenance strategy.

SUMMARY

In one aspect, a stroboscopic device, comprising: a camera for acquiring video frames; a light source; and at least one hardware processor; and software that is configured to, when executed by the at least one hardware processor, acquire a sequence of video frames via the camera, convert the frames from RGB to grayscale, for a first and second frame in the sequence of video frames, compute the dense optical flow field between the two frames, wherein the optical flow field contains a flow vector for each pixel in each of the first and second frames, indicating the motion of that pixel from the first frame to the second frame, calculate the average magnitude (Average Optical Flow or AOF) of all flow vectors for each pixel in the first and second frames, compare the AOF to a threshold, and store a result based on the comparison, repeat the process for all frames in the sequence of video frames, determine whether a stroboscopic effect has been achieved based on the store results, control the activation of the light source until the results indicate that the stroboscopic effect has been achieved, control the activation of the light source until the results indicate that the stroboscopic effect has been achieved, and obtain a further sequence of video frames after the stroboscopic effect is achieved, identify an object in the further sequence of video frames, and automatically detect movement or vibration of the identified object.

In one aspect, A stroboscopic device, comprising: a camera for acquiring video frames; a light source; and at least one hardware processor; and software that is configured to, when executed by the at least one hardware processor, acquire a sequence of video frames via the camera, convert the frames from RGB to grayscale, for a first and second frame in the sequence of video frames, compute the dense optical flow field between the two frames, wherein the optical flow field contains a flow vector for each pixel in each of the first and second frames, indicating the motion of that pixel from the first frame to the second frame, calculate the average magnitude (Average Optical Flow or AOF) of all flow vectors for each pixel in the first and second frames, compare the AOF to a threshold, and store a result based on the comparison, repeat the process for all frames in the sequence of video frames, determine whether a stroboscopic effect has been achieved based on the store results, control the activation of the light source until the results indicate that the stroboscopic effect has been achieved, and obtain a further sequence of video frames after the stroboscopic effect is achieved, identify an object in the further sequence of video frames, and automatically detect movement or vibration of the identified object, wherein identifying an object in the further sequence of video frames and detecting movement or vibration comprises passing the further sequence of video frames to a model.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
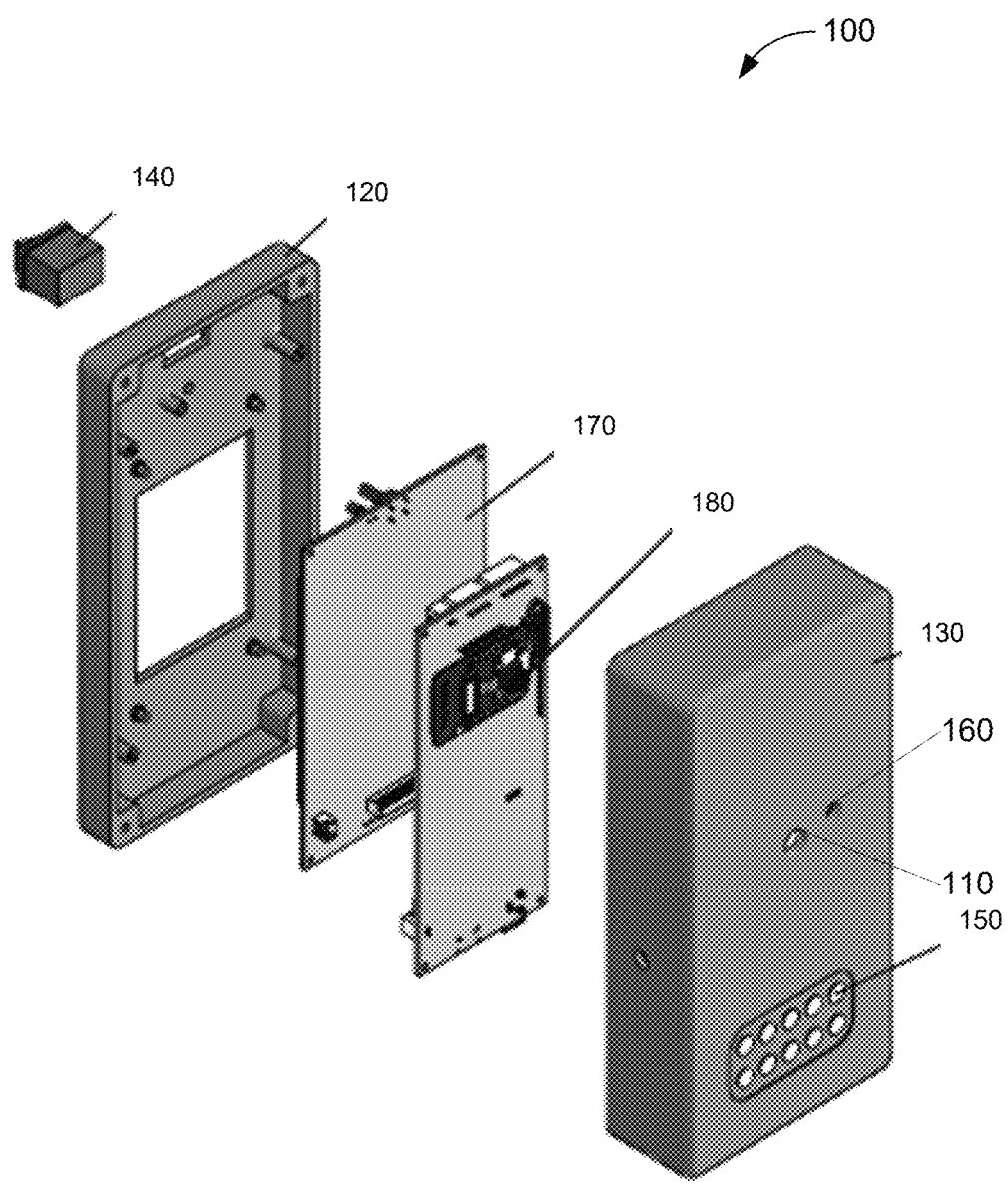
FIG. 1 illustrates an exploded view of a stroboscope with an AI-based system, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent that these or other embodiments can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

After reading this description, it will become apparent to one skilled in the art how to implement the embodiments in various alternative implementations and alternative applications. However, although various embodiments will be described herein, it is understood that these embodiments are presented by way of example and illustration only, and not limitation. As such, this detailed description of various embodiments should not be construed to limit the scope or breadth of the of the appended claims.

The systems and methods described herein are meticulously designed to operate in a non-invasive manner, e.g., ensuring that the input is acquired through an on-chip camera. This design choice is crucial for applications requiring minimal interference with the object or environment being observed; however, one significant challenge in such systems is image blurring, which can arise from several factors. These include the distance between the camera and the object under inspection, the size of the object, specific characteristics of the camera, and flash specifications such as the duty cycle. Environmental conditions can also contribute to the blurring effect.

Addressing the issue of image blurring, the systems and methods incorporated herein provide a solution that automates the stroboscope with a high degree of robustness. Conventional methods that rely heavily on the clear visual features of objects often struggle with blurred images, leading to inaccuracies; however, the systems and methods described herein rely on the relative change in dense optical flow rather than the static visual features of the object. Dense optical flow refers to the motion pattern of objects in a visual scene caused by the relative movement between the observer and the scene. The systems and methods described herein can accurately track and analyze objects even when the images are not perfectly clear by focusing on the changes in this optical flow.

The systems and methods described herein provide significant advantages. First, the systems and methods described herein ensure that such systems remain robust and accurate even in less-than-ideal conditions, where traditional image processing techniques might fail. Second, the systems and methods described herein provide the capability of the systems and methods described herein to detect stroboscopic events, which are events occurring in rapid succession and often difficult to perceive clearly due to their speed and the resulting image blur, are particularly adept at identifying events due to the use of optical flow changes. For example, the systems and methods described herein use optical flow analysis, as described in detail below, to compare consecutive video frames to detect motion changes. This comparison is relative and based on the motion between frames rather than absolute pixel values. Therefore, minor distortions or noise in individual frames are less likely to impact performance.

The optical flow analysis described herein focuses on estimating the motion of objects or features between frames. The analysis is used to calculate the displacement of pixels between frames, allowing the detection of movements even in the presence of blur or noise. Since the analysis is motion-centric, it can still identify stroboscopic effects based on changes in motion patterns. The solution considers the temporal consistency of motion across frames. The process looks for consistent motion patterns over time by comparing each frame with its previous frame. This approach helps distinguish actual motion (e.g., stroboscopic effects) from random noise or artifacts in individual frames by considering local image gradients and flow constraints to estimate motion vectors, reducing the impact of image imperfections on the overall analysis.

Additionally, the systems and methods described herein are configured to select a duty cycle that optimally balances brightness and the ability to capture sharp images of fast-moving objects. The duty cycle refers to the percentage of time that one or more, e.g., LED lights are on during each flash cycle. Thus, the systems and methods described herein optimize the duty cycle value with the distance as the device initiates so that the systems and methods described herein can handle variable distances. Thus, the systems and methods described herien can be fully automated to handle variable distances by optimizing the flash duty cycle, as described in more detail below. The duty cycle in a stroboscope refers to the proportion of time that the light source is on compared to the entire cycle of its operation. Essentially, it's a measure of the "on time" of the flash in relation to the "off time." Therefore, the present invention discloses a dynamic duty cycle to improve the current art.

Duty Cycle in Stroboscopes

Duty cycle in a stroboscope refers to the ratio of the time the light is on (illuminating the subject) to the total time of the stroboscopic flash cycle. Basically, it represents how much of the time the light is actively flashing compared to the duration of a full cycle. For instance, if the light is on for half of the cycle and off for the other half, the duty cycle would be 50%. In order to capture images, stroboscopic lights emit short-duration flashes, often measured in microseconds.

This short duration is crucial for effectively freezing the motion of a rapidly moving or rotating object; however, the duty cycle is usually very small. For example, a flash that lasts 10 microseconds with a period (the total duration of one cycle of flashing and not flashing) of 1 millisecond would have a duty cycle of 1% (10 microseconds/1,000 microseconds). A lower duty cycle means the light is on for a shorter duration, which is advantageous for reducing motion blur and increasing the sharpness of the image in applications where high-speed motion capture is required.

In practical terms, adjusting the duty cycle allows for controlling the brightness and clarity of the visual effect produced by the stroboscope, crucial in applications such as machinery inspection, motion analysis, or entertainment lighting. The duty cycle can be adjusted depending on the application's specific needs in many advanced stroboscopes. This adjustability allows users to balance brightness and temporal resolution. The duty cycle affects how much light is emitted and thus can impact the brightness of the observed image. In some applications, especially in low-light conditions, a balance must be struck between sufficient exposure to see the object and a short enough exposure to freeze motion. This allows improved stroboscope performance that overcomes the limitations described above.

1. System Overview 1.1. Infrastructure

Figure 5:
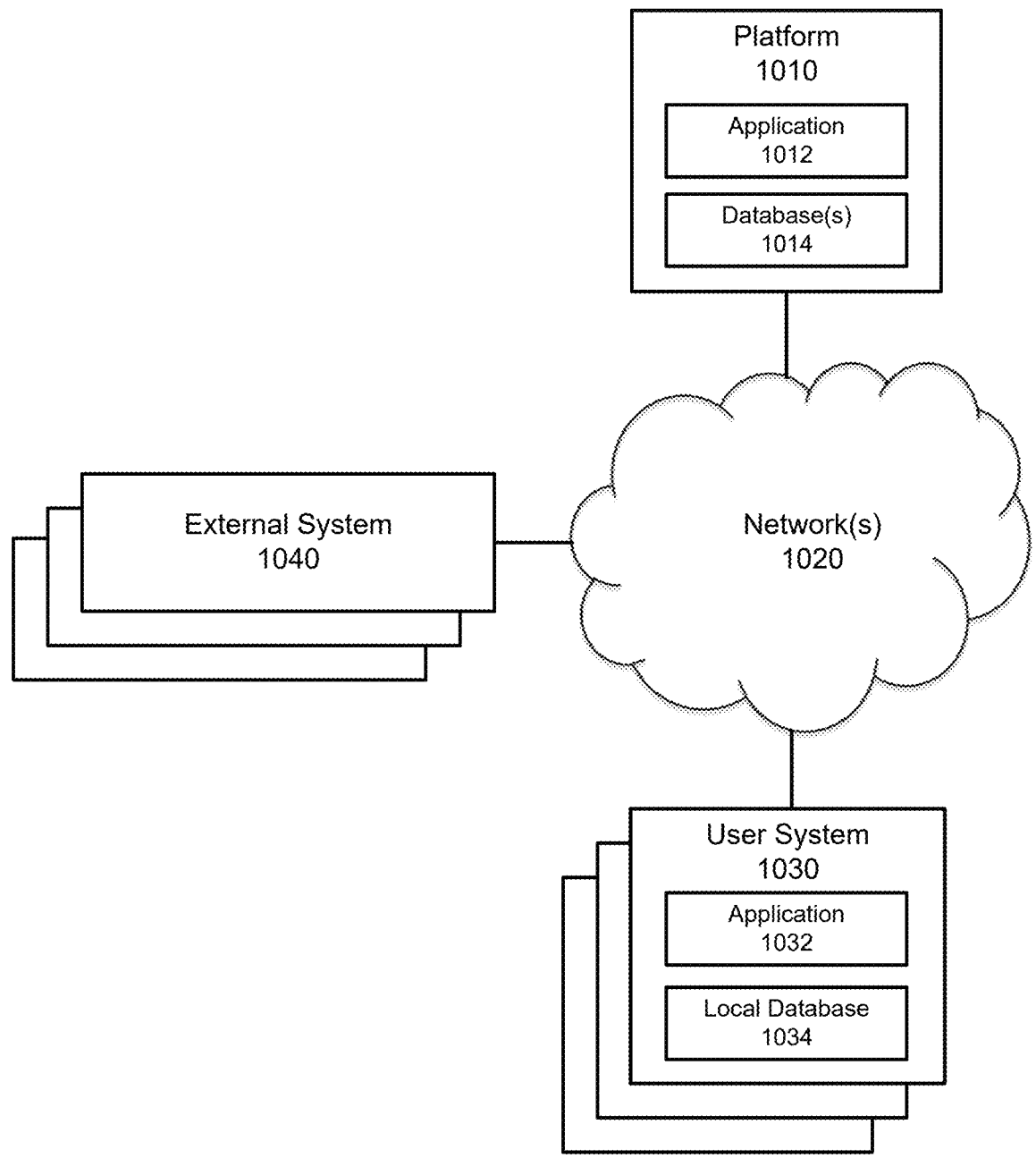
FIG. 5 illustrates an example infrastructure in which one or more of the disclosed processes may be implemented, according to an embodiment.

With the above in mind, FIG. 5 illustrates an example infrastructure in which one or more of the disclosed processes may be implemented, according to an embodiment. The infrastructure may comprise a platform 1010 (e.g., one or more servers) which hosts and/or executes one or more of the various processes (e.g., methods or functions, implemented as software modules) described herein. Platform 1010 may comprise dedicated servers, or may instead be implemented in a computing cloud, in which the resources of one or more servers are dynamically and elastically allocated to multiple tenants based on demand. In either case, the servers may be collocated and/or geographically distributed. Platform 1010 may also comprise or be communicatively connected to a server application 1012 and/or one or more databases 1014. In addition, platform 1010 may be communicatively connected to one or more user systems 1030 via one or more networks 1020. Platform 1010 may also be communicatively connected to one or more external systems 1040 (e.g., other platforms, websites, etc.) via one or more networks 1020.

Network(s) 1020 may comprise the Internet, and platform 1010 may communicate with user system(s) 1030 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 1010 is illustrated as being connected to various systems through a single set of network(s) 1020, it should be understood that platform 1010 may be connected to the various systems via different sets of one or more networks. For example, platform 1010 may be connected to a subset of user systems 1030 and/or external systems 1040 via the Internet, but may be connected to one or more other user systems 1030 and/or external systems 1040 via an intranet. Furthermore, while only a few user systems 1030 and external systems 1040, one server application 1012, and one set of database(s) 1014 are illustrated, it should be understood that the infrastructure may comprise any number of user systems, external systems, server applications, and databases.

User system(s) 1030 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 1030 may comprise or be communicatively connected to a client application 1032 and/or one or more local databases 1034.

Platform 1010 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 1010 transmits or serves one or more screens of the graphical user interface in response to requests from user system(s) 1030. In some embodiments, these screens may be served in the form of a wizard, in which case two or more screens may be served in a sequential manner, and one or more of the sequential screens may depend on an interaction of the user or user system 1030 with one or more preceding screens. The requests to platform 1010 and the responses from platform 1010, including the screens of the graphical user interface, may both be communicated through network(s) 1020, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 1014) that are locally and/or remotely accessible to platform 1010. It should be understood that platform 1010 may also respond to other requests from user system(s) 1030.

Platform 1010 may comprise, be communicatively coupled with, or otherwise have access to one or more database(s) 1014. For example, platform 1010 may comprise one or more database servers which manage one or more databases 1014. Server application 1012 executing on platform 1010 and/or client application 1032 executing on user system 1030 may submit data (e.g., user data, form data, etc.) to be stored in database(s) 1014, and/or request access to data stored in database(s) 1014. Any suitable database may be utilized, including without limitation MySQL™, Oracle™, IBM™, Microsoft SQL™, Access™, PostgreSQL™, MongoDB™, and the like, including cloud-based databases and proprietary databases. Data may be sent to platform 1010, for instance, using the well-known POST request supported by HTTP, via FTP, and/or the like. This data, as well as other requests, may be handled, for example, by server-side web technology, such as a servlet or other software module (e.g., comprised in server application 1012), executed by platform 1010.

In embodiments in which a web service is provided, platform 1010 may receive requests from user system(s) 1030 and/or external system(s) 1040, and provide responses in extensible Markup Language (XML), JavaScript Object Notation (JSON), and/or any other suitable or desired format. In such embodiments, platform 1010 may provide an application programming interface (API) which defines the manner in which user system(s) 1030 and/or external system(s) 1040 may interact with the web service. Thus, user system(s) 1030 and/or external system(s) 1040 (which may themselves be servers), can define their own user interfaces, and rely on the web service to implement or otherwise provide the backend processes (e.g., methods and functionality), storage, and/or the like, described herein. For example, in such an embodiment, a client application 1032, executing on one or more user system(s) 1030, may interact with a server application 1012 executing on platform 1010 to execute one or more or a portion of one or more of the various process(es) described herein.

Client application 1032 may be "thin," in which case processing is primarily carried out server-side by server application 1012 on platform 1010. A basic example of a thin client application 1032 is a browser application, which simply requests, receives, and renders webpages at user system(s) 1030, while server application 1012 on platform 1010 is responsible for generating the webpages and managing database functions. Alternatively, the client application may be "thick," in which case processing is primarily carried out client-side by user system(s) 1030. It should be understood that client application 1032 may perform an amount of processing, relative to server application 1012 on platform 1010, at any point along this spectrum between "thin" and "thick," depending on the design goals of the particular implementation. In any case, the software described herein, which may wholly reside on either platform 1010 (e.g., in which case server application 1012 performs all processing) or user system(s) 1030 (e.g., in which case client application 1032 performs all processing) or be distributed between platform 1010 and user system(s) 1030 (e.g., in which case server application 1012 and client application 1032 both perform processing), can comprise one or more executable software modules comprising instructions that implement one or more of the processes (e.g., methods or functions) described herein.

1.2. Example Processing Device

Figure 6:
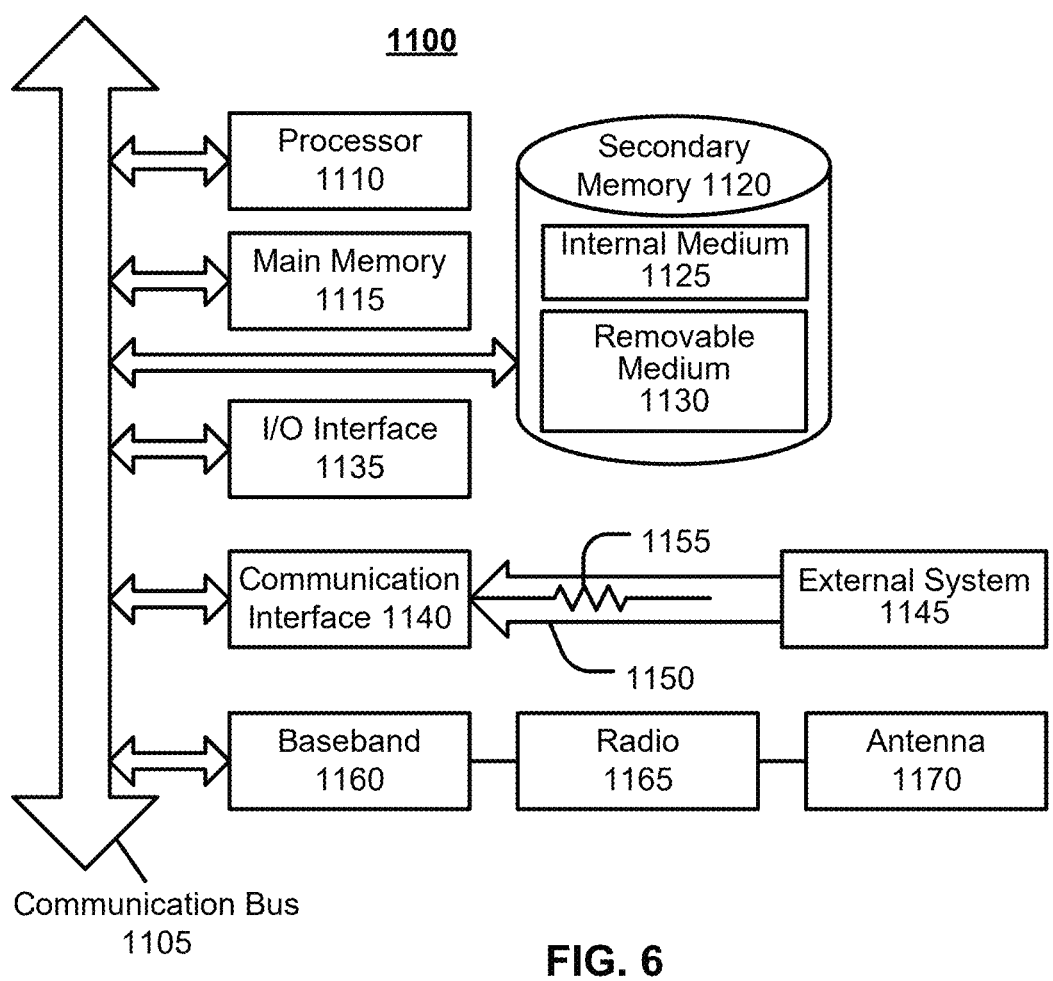
FIG. 6 illustrates remote control of a work machine in a machine environment, according to an embodiment.

FIG. 6 illustrates an example processing system 100, according to an embodiment. For example, system 1100 may be used as or in conjunction with one or more of the processes (e.g., to store and/or execute the software), including any methods or functions, described herein, and may represent components of platform 1010, user system(s) 1030, external system(s) 1040, and/or other processing devices described herein. System 1100 can be any processor-enabled device (e.g., server, personal computer, etc.) that is capable of wired or wireless data communication. Other processing systems and/or architectures may also be used, as will be clear to those skilled in the art.

System 1100 may comprise one or more processors 1110. Processor(s) 1110 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 1110. Examples of processors which may be used with system 1100 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 1110 may be connected to a communication bus 1105. Communication bus 1105 may include a data channel for facilitating information transfer between storage and other peripheral components of system 1100. Furthermore, communication bus 1105 may provide a set of signals used for communication with processor 1110, including a data bus, address bus, and/or control bus (not shown). Communication bus 1105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 1100 may comprise main memory 1115. Main memory 1115 provides storage of instructions and data for programs executing on processor 1110, such as any of the software discussed herein. It should be understood that programs stored in the memory and executed by processor 1110 may be written and/or compiled according to any suitable language, including without limitation C/C++, Java, JavaScript, Perl, Python, Visual Basic,.NET, and the like. Main memory 1115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 1100 may comprise secondary memory 1120. Secondary memory 1120 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 1100. The computer software stored on secondary memory 1120 is read into main memory 1115 for execution by processor 1110. Secondary memory 1120 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 1120 may include an internal medium 1125 and/or a removable medium 1130. Internal medium 1125 and removable medium 1130 are read from and/or written to in any well-known manner. Internal medium 1125 may comprise one or more hard disk drives, solid state drives, and/or the like. Removable storage medium 1130 may be, for example, a magnetic tape drive, a compact disc (CD) drive, a digital versatile disc (DVD) drive, other optical drive, a flash memory drive, and/or the like.

System 1100 may comprise an input/output (I/O) interface 1135. I/O interface 1135 provides an interface between one or more components of system 1100 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

System 1100 may comprise a communication interface 1140. Communication interface 1140 allows software to be transferred between system 1100 and external devices (e.g. printers), networks, or other information sources. For example, computer-executable code and/or data may be transferred to system 1100 from a network server (e.g., platform 1010) via communication interface 1140. Examples of communication interface 1140 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 1100 with a network (e.g., network(s) 1020) or another computing device. Communication interface 1140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 1140 is generally in the form of electrical communication signals 1155. These signals 1155 may be provided to communication interface 1140 via a communication channel 1150 between communication interface 1140 and an external system 1145 (e.g., which may correspond to an external system 1040, an external computer-readable medium, and/or the like). In an embodiment, communication channel 1150 may be a wired or wireless network (e.g., network(s) 1020), or any variety of other communication links. Communication channel 1150 carries signals 1155 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 1115 and/or secondary memory 220. Computer-executable code can also be received from an external system 1145 via communication interface 1140 and stored in main memory 1115 and/or secondary memory 1120. Such computer-executable code, when executed, enable system 1100 to perform the various process(es) of the disclosed embodiments as described elsewhere herein.

In an embodiment that is implemented using software, the software may be stored on a computer-readable medium and initially loaded into system 1100 by way of removable medium 1130, I/O interface 1135, or communication interface 1140. In such an embodiment, the software is loaded into system 1100 in the form of electrical communication signals 1155. The software, when executed by processor 1110, preferably causes processor 1110 to perform one or more of the processes described elsewhere herein.

System 1100 may comprise wireless communication components that facilitate wireless communication over a voice network and/or a data network (e.g., in the case of user system 1030). The wireless communication components comprise an antenna system 1170, a radio system 1165, and a baseband system 1160. In system 1100, radio frequency (RF) signals are transmitted and received over the air by antenna system 1170 under the management of radio system 1165.

In an embodiment, antenna system 1170 may comprise one or more antennae and one or more multiplexors (not shown) that perform a switching function to provide antenna system 1170 with transmit and receive signal paths. In the receive path, received RF signals can be coupled from a multiplexor to a low noise amplifier (not shown) that amplifies the received RF signal and sends the amplified signal to radio system 1165.

In an alternative embodiment, radio system 1165 may comprise one or more radios that are configured to communicate over various frequencies. In an embodiment, radio system 1165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 1165 to baseband system 1160.

If the received signal contains audio information, then baseband system 1160 decodes the signal and converts it to an analog signal. Then the signal is amplified and sent to a speaker. Baseband system 1160 also receives analog audio signals from a microphone. These analog audio signals are converted to digital signals and encoded by baseband system 1160. Baseband system 1160 also encodes the digital signals for transmission and generates a baseband transmit audio signal that is routed to the modulator portion of radio system 1165. The modulator mixes the baseband transmit audio signal with an RF carrier signal, generating an RF transmit signal that is routed to antenna system 1170 and may pass through a power amplifier (not shown). The power amplifier amplifies the RF transmit signal and routes it to antenna system 1170, where the signal is switched to the antenna port for transmission.

Baseband system 1160 is communicatively coupled with processor(s) 1110, which have access to memory 1115 and 1120. Thus, software can be received from baseband processor 1160 and stored in main memory 1110 or in secondary memory 1120, or executed upon receipt. Such software, when executed, can enable system 1100 to perform the various process(es) of the disclosed embodiments.

1.3 Example Stroboscope

FIG. 1 illustrates an exploded view of a stroboscope device 100 configured in accordance with the systems and methods described herein, and including an AI-based system 100, according to an embodiment. Stroboscope 100 with an AI-based system comprises an Printed Circuit Board (PCB) 180, a casing bottom 120 and a casing top 130, and an on/off switch 140. Casing top 130 can comprise one or more Light Emitting Diodes (LED) lights 150, a flash 160, and a camera lens 110. Casing top 120 can include a display 132 that can be interfaced with a display board 170.

PCB 180 can include a camera. Moreover, PCB 180, or more specifically the circuits and software included therein, feeds data information to an AI processor, which can be implemented as a processor 1110 and which then calculates the necessary frequency for the stroboscope 100 to flash. AI processor 1110 can be configured to control the timing and intensity of one or more LED lights 150, housed within casing bottom 120 and casing top 130, to create the desired strobe effect with one or more LED lights 150. Switch 140 allows for user control, enabling the stroboscope to be turned on or off. Display 132 can provide feedback on settings or operational status. cable gland 160 ensures secure connection of external power or communication cables, enhancing Stroboscope with an AI-based system's 100 reliability and functionality. Further, it should be understood that one or more LED lights 150 is not limited to only LED lights and can include any type of lights.

Stroboscope 100 allows for the detection of the frequency of movement of an object under observation and sends signals to AI processor 1110, allowing it to synchronize one or more LED lights 150 flashing frequency with the object's frequency of movement. This synchronization creates the illusion of the object being still or moving slowly, which aids in analyzing its motion or behavior.

In stroboscope 100, casing bottom 120 and casing top 130 can serve for housing and protecting the internal components of stroboscope 100 while providing structural integrity to stroboscope 100. Casing bottom 120 or top 130 can include features such as rubber feet or grips to prevent slippage during operation. Additionally, casing bottom 120 or bottom 130 can incorporate ports or openings for power supply connections, user interface elements, or ventilation to prevent overheating of internal components in stroboscope 100.

Casing top 130 and bottom 120 can enclose system 1100 and other components of stroboscope 100, shielding them from dust, moisture, and physical damage. Casing bottom 120 can comprise a transparent or translucent window through which one or more LED lights 150 emit light, allowing users to observe the illuminated object. Casing top 130 can be designed to be durable and resistant to environmental factors to ensure reliable performance even in challenging conditions. Additionally, casing top 130 can include controls or indicators for adjusting one or more LED lights 150 frequency, intensity, or other settings, providing users with convenient access to key functionalities.

Switch 140 serves as a user-operated control mechanism for turning stroboscope 100 on or off and often for adjusting stroboscope 100 operational parameters. Switch 140 can take various forms, such as a simple toggle switch, push-button switch, or rotary dial, depending on the design of stroboscope 100. Switch 140 can complete or interrupt the electrical circuitry within stroboscope 100 when activated and enabling or disabling the flow of current to the internal components. Additionally, stroboscope 100 can use switch 140 for adjusting one or more LED lights 150 frequency, intensity, or other settings, providing users with flexibility to customize the device's behavior to suit their specific needs.

As noted, stroboscope 100 comprises one or more LED lights 150. One or more LED (or other types of) lights 150 serve as the primary light source for creating rapid, intense flashes of light. These flashes are synchronized with the periodic motion of an object under observation, allowing stroboscope 100 to freeze the motion or create the illusion of slow-motion. One or more LED lights 150 can be well-suited for this purpose due to their rapid response times and ability to produce high-intensity light output with minimal energy consumption. Additionally, one or more LED lights 150 can emit short bursts of light at precise intervals, effectively illuminating the moving object only when it is in a specific position in its cycle. Synchronized illumination of the one or more LED lights 150 can enable users to analyze and study an object's motion or behavior with precision. It should be understood that one or more LED lights 150 is not limited to only LED lights and can include any type of light.

Display 132 in stroboscope 100 serves as the interface through which users control and monitor the device's settings and output. Display 132 can include a digital screen that displays crucial information such as the flash rate, intensity, and synchronization options. Users can adjust stroboscope 100 parameters through display 132 to match the requirements of their specific application, whether it's in industrial settings for machinery inspection, scientific experiments, or entertainment purposes.

As described below, stroboscope 100 has enhanced functionality enabled intelligent automation and advanced features. With AI capabilities, processor 1110 becomes an AI processor 1110 that can analyze incoming data from sensors or cameras to detect and track objects or patterns in the stroboscopic light. This allows for automated adjustment of flash timing or intensity based on the detected motion or changes in the scene, ensuring optimal illumination for inspection or analysis tasks. Additionally, such an AI processor 1110 can learn from previous usage patterns to optimize performance over time, adapting to different environments or applications. AI processor 1110 can transform stroboscope 100 into a smart device capable of autonomous decision-making and intelligent operation, enhancing its effectiveness and usability in various scenarios.

Figure 2:
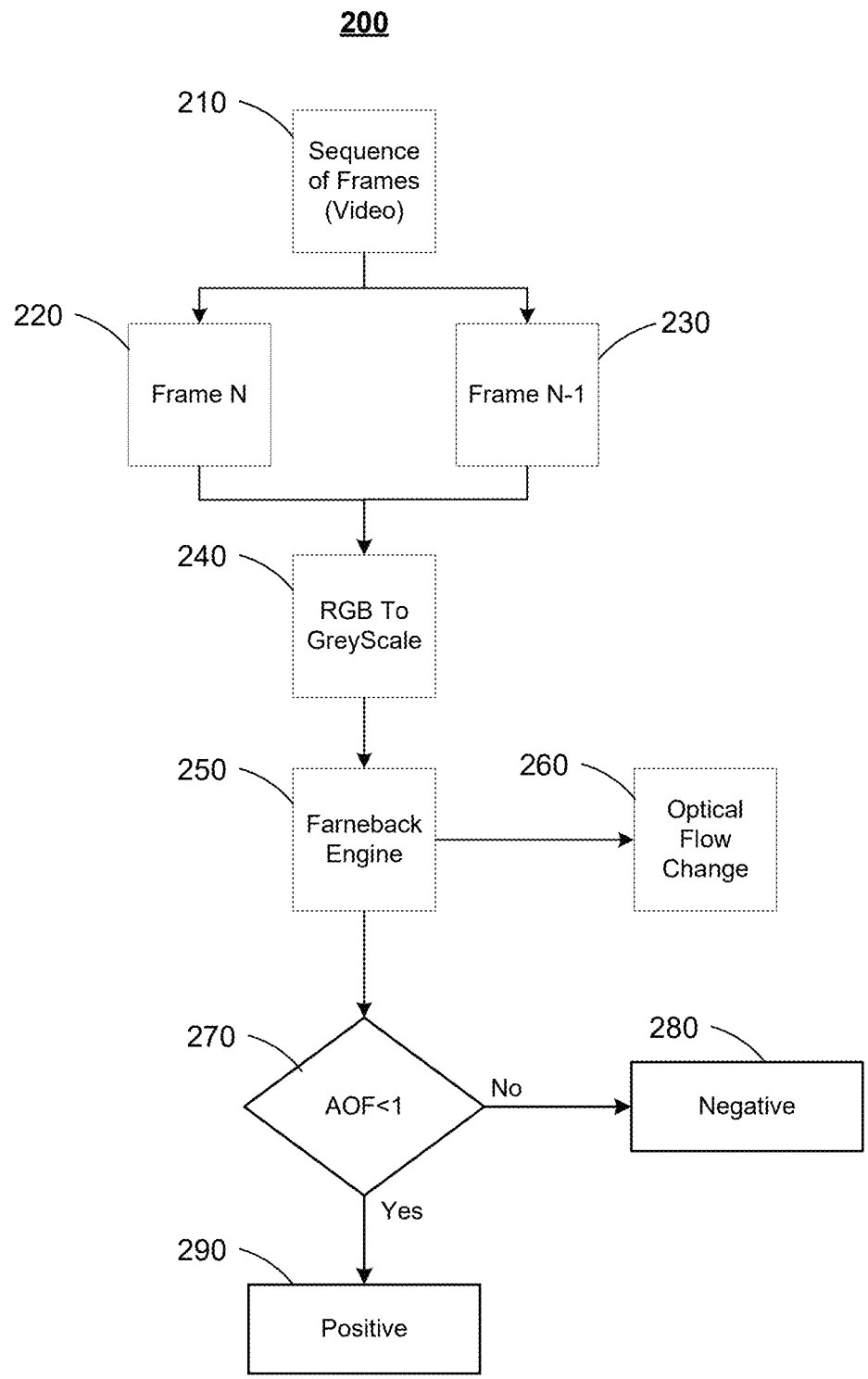
FIG. 2 illustrates an example processing system for detecting a stroboscopic effect, according to an embodiment.
Figure 3:
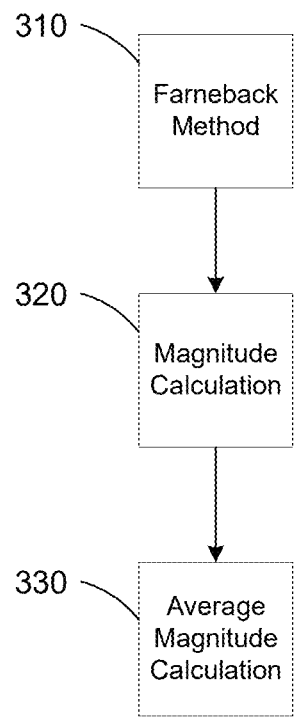
FIG. 3 illustrates a process for calculating an optical flow between consecutive video frames, according to an embodiment.
Figure 4:
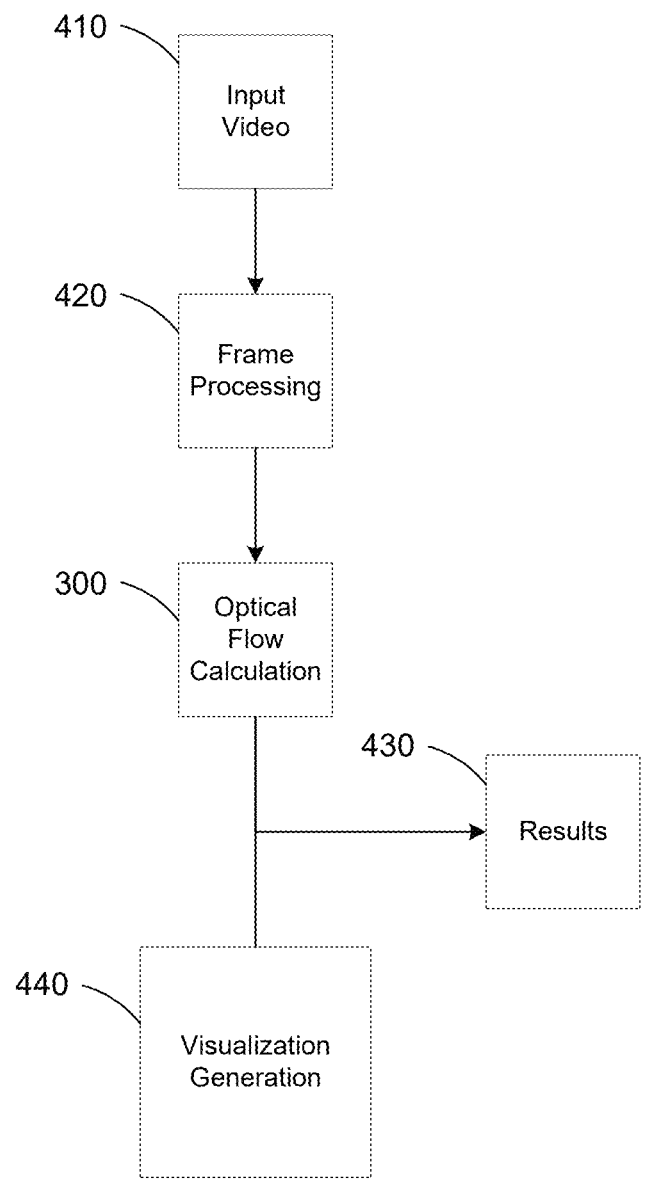
FIG. 4 illustrates an algorithm process of a stroboscope with an AI-based system, according to an embodiment.

An AI-based system for automated detection of the stroboscopic effect, such as illustrated in FIG. 1 and described with respect to FIGS. 2-4, can significantly enhance the accuracy and efficiency of data readings obtained from stroboscopes. Such a stroboscope 100 can intelligently process the visual data captured by the stroboscope and apply advanced algorithms and machine learning techniques to effectively filter patterns that might affect readings. Such an AI-based system for automated detection of the stroboscopic effect can autonomously adjust the stroboscope's parameters, such as frequency and phase, to optimize synchronization with the machinery's motion, ensuring precise data acquisition. In addition, the AI algorithms disclosed below can learn from historical data to recognize normal operation patterns and quickly identify deviations or anomalies, enabling proactive maintenance interventions.

2. Process Overview

Embodiments of processes for automated detection of the stroboscopic effect will now be described in detail. It should be understood that the described processes may be embodied in one or more software modules that are executed by one or more hardware processors (e.g., processor 1110), for example, as a software application (e.g., server application 1012, client application 1032, and/or a distributed application comprising both server application 1012 and client application 1032), which may be executed wholly by processor(s) of platform 1010, wholly by processor(s) of user system(s) 1030, or may be distributed across platform 1010 and user system(s) 1030, such that some portions or modules of the software application are executed by platform 1010 and other portions or modules of the software application are executed by user system(s) 1030. The described processes may be implemented as instructions represented in source code, object code, and/or machine code. These instructions may be executed directly by hardware processor(s) 1110, or alternatively, may be executed by a virtual machine operating between the object code and hardware processor(s) 1110. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Detecting a Stroboscopic Effect

FIG. 2 illustrates an example process for detecting a stroboscopic effect, using stroboscope 100, according to an example embodiment. For example, process 200 can be used for industrial inspection. Process 200 can be implemented in software and/or hardware, e.g., within device 100 and/or platform 1010. While process 200 is illustrated with a certain arrangement and ordering of subprocesses, process 200 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In step 210, a sequence of frames are acquired from a video obtained with stroboscope 100. When a flash from one or more LED lights 150 at a certain FpM (Flashes per Minute) hits a moving object, and if the FpM is not equal to the RPM (Rotations per Minute) of the object, the object components can appear to be moving in a breakneck speed visually in the sequence of frames; however, when the FpM equals the RpM, then the stroboscopic effect is achieved, and the object component appears to be static or very slow-moving. And when the Stroboscopic impact is completed, the change in each frame of the video obtained by stroboscope 100 is very minor. When the stroboscopic impact is not achieved, the visual change in each frame is significant.

In steps 220 and 230, the change of the optical flow in each pixel for two frames can be determined. The solution depicted in process 200 is designed to determine the change in the optical flow in each pixel for two frames obtained by stroboscope 100, N−1 and N. This is also known as dense optical flow. Based on dense optical flow, e.g., processor 1110 computes the magnitude of the average change in optical flow over all pixels in two frames. If the change is less than a threshold (by default 1), the visual change in both frames has been small. Small changes refer to the stroboscopic effect, and vice versa.

As illustrated in steps 220 and 230, from a sequence of frames, two frames, current (N) and previous (N−1), are picked. Further, in step 240, the frames are converted into single-channel grayscale images from three-channel red, green, and blue (RGB) images. Each RGB image is composed of three-color channels: red, green, and blue. To convert it into a grayscale image, the intensity values from these three channels are combined using a weighted average, where each channel contributes to the overall brightness of the pixel. These weights are chosen to match the human perception of brightness, with red, green, and blue channels. The weighted sum forms the grayscale pixel value, resulting in a single-channel image where each pixel represents the luminance or brightness of the original image, allowing for easier analysis and interpretation of the captured frames in step 250.

In step 250, images from three-channel RGB images are passed onto, e.g., a Farneback Engine or the like. The Farneback Engine then computes the dense optical flow field between the two frames. This flow field contains a flow vector for each pixel in the image, indicating the motion of that pixel from the previous frame to the current frame. The average magnitude of all flow vectors can then be calculated. This is called AOF (Average Optical Flow) and represents the change in both frames, which is presented in step 260. The AOF is then tested against a threshold value, in step 270, which by default set to 1. If AOF is less than 1, the result is positive as indicated in step 290, otherwise the result is negative as indicate din step 280.

Process 200 is repeated for all frames in a sequence (video) obtained by stroboscope 100, and for every pair of frames in steps 220 and 230, and the results are stored as either positive or negative in processor 1110. The percentage is calculated for positive results throughout the sequence. In sequences where the stroboscopic impact is achieved, the percentage of positive results can be greater than 95%.

2.3 Calculating Optical Flow

FIG. 3 illustrates a process 300 for calculating an optical flow between consecutive video frames, according to an example embodiment. Process 300 can be implemented in software and/or hardware, e.g., within processor 1110. While process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In step 310, the optical flow between consecutive video frames is calculated using a function in step 310 that computes the dense optical flow using the Farneback method, which estimates motion vectors for every pixel in the image obtained by stroboscope 100. In other words, stroboscope 100 calculates the optical flow between consecutive video frames using a function in system 1100. This function computes the dense optical flow using the Farneback method, which estimates motion vectors for every pixel in the image.

Further, by computing the dense optical flow, the, e.g., Farneback method estimates the motion field between two consecutive frames in a video sequence obtained by stroboscope 100. Unlike sparse optical flow methods that only estimate motion at specific points or features in the image, dense optical flow methods estimate motion at every pixel in the picture. The Farneback algorithm can be configured to compute optical flow using a polynomial expansion to model the local image structure around each pixel. It then estimates the motion between two frames by matching these local models. The method is computationally efficient and provides accurate results even in large displacements and occlusions.

As mentioned above, the solution in process 300 is designed to be deterministic and transparent. Thus, the process described essentially visualizes the optical flow throughout the video to get an idea of how robust the technique is and exactly how this technique decides whether the stroboscopic effect is achieved. The visualization of change in the dense optical flow of video captured by stroboscope 100 has at least two use cases. First, stroboscope the visualization allows determination of how the technique detects the stroboscopic effect. Second, the visualization output obtained represents the change in the dense optical flow. The dense optical flow can be helpful for underlying downstream tasks such as crack detection or misalignment detection in industrial machinery or any other fast-moving objects. By using AI-based technology, as described herein, stroboscope 100 can boost the performance through AI processor module 180 of system 1100 and enrich the feature representation. The representation of the information can be utilized for training such algorithms in AI processor module 180.

After the dense optical flow is computed using the, e.g., Farneback method in step 310, the magnitude calculation is determined in step 320. For example, let OF represent the optical flow vector field calculated between two consecutive frames. The magnitude of an optical flow vector v is given by $\|v\|=\sqrt{(vx)2+(vy)2}$, where vx and vy are the horizontal and vertical components of v. The average magnitude M of optical flow vectors is computed as $M=1/N \sum_{i=1}\|OFi\|$, where N is the number of optical flow vectors.

The critical insight for detecting the stroboscopic effect with stroboscope 100 lies in the behavior of the average magnitude of optical flow vectors. When the stroboscopic impact is achieved, the object appears stationary or moving slowly due to synchronization with the frequency of the one or more LED lights 150. After computing the optical flow, system 1100 can be configured to extract the horizontal and vertical components of the motion vectors. The magnitude of each optical flow vector represents the speed or magnitude of motion for the corresponding pixel. Then, system 110 can be configured to compute the magnitude of optical flow vectors using, e.g., the cv2.magnitude function. The cv2.magnitude function is used to compute the magnitude of a 2D vector specified by its x and y components. It calculates the magnitude for each pixel in the input arrays and can be used for processing tasks, such as computing gradients, edge detection, and optical flow.

The critical insight for detecting the stroboscopic effect lies in the behavior of the average magnitude of optical flow vectors. When the stroboscopic impact is achieved, the object appears stationary or moving slowly due to synchronization with the strobe light frequency. Consequently, the average magnitude of optical flow vectors is expected to be low, as there is limited motion between consecutive frames. The average magnitude can then be compared to a threshold value (in this case, 1.0). If the average magnitude falls below the threshold, then it can be concluded that the stroboscopic effect is detected. If the stroboscopic effect is detected, it indicates that the object in the scene appears stationary or moving slowly despite actual motion occurring. On the other hand, if the stroboscopic effect is not detected (i.e., the average magnitude is above the threshold), the object is moving more freely between frames, indicating that the stroboscopic impact is not achieved.

Figure 7A:
FIGS. 7A and 7B are visualizations represents the direction and magnitude of the motion of a small region in a video frame between consecutive frames of a video of the object being analyzed illustrates machine learning for project management, according to an embodiment.
Figure 7B:
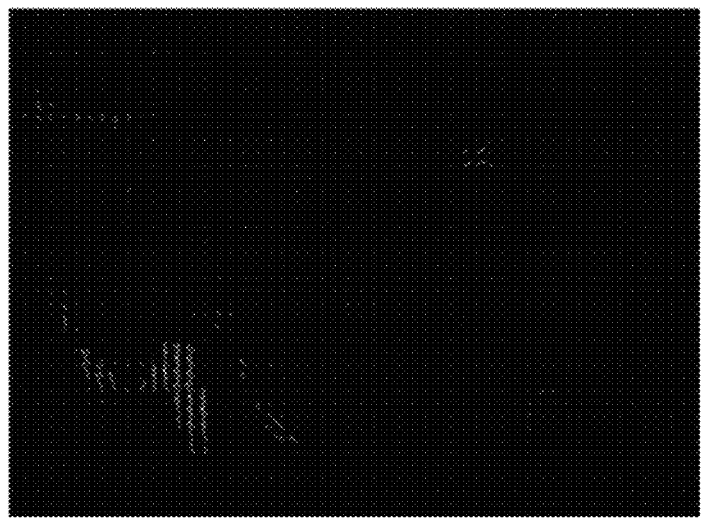

In the images or visualizations of FIGS. 7A and 7B. Each arrow the visualizations represents the direction and magnitude of the motion of a small region in a video frame between consecutive frames of a video of the object being analyzed. The direction of the arrow indicates the direction of motion. For example, if the arrow points to the right, the region is moving toward the right in the current frame compared to the previous frame. The length of the arrow represents the magnitude or speed of the motion. A longer arrows indicate faster motion, while shorter arrows indicate slower motion.

In the visualizations of FIGS. 7A and 7B, the arrows are green. The color is arbitrary and chosen for better visibility. The density of the arrows depends on the step parameter. Smaller values of step result in denser arrow visualization, while larger values result in sparser arrow visualization. The arrows represent the motion of each small region in the current frame compared to the previous frame.

The visualization of FIG. 7A represents a video in which a fan moves and the stroboscopic effect is not achieved. In contrast, the visualization of FIG. 7B represents a video in which the fan is almost stationary, and the stroboscopic effect is achieved. It can be seen in FIG. 7B that the change in optical flow is minor, as represented by a minimal number of green arrows in the central region of the pixel grid.

After the magnitude of optical flow vectors for each pixel are calculated in step 320, the average magnitude across the entire frame is calculated in step 330. The average magnitude measures the overall motion present in the frame. Consequently, the average magnitude of optical flow vectors is expected to be low, as there is limited motion between consecutive frames. By setting a threshold value (in this case, 1.0), processor 1110 can compare the average magnitude against this threshold. If the average magnitude falls below the threshold, processor 1110 can conclude that the stroboscopic effect is detected. If the stroboscopic effect is detected, then processor 1110 can indicate that the object in the scene appears stationary or moving slowly despite actual motion occurring. On the other hand, if the stroboscopic effect is not detected (i.e., the average magnitude is above the threshold), the object is moving more freely between frames, indicating that the stroboscopic impact is not achieved. Once Stroboscopic effect is identified, the use of AI to detect a defect using AI like Siamese, SRGAN (described in detail below), or other neural networks can be implemented processor 1110.

Farneback method is used (step 310) because it computes the dense optical flow at the pixel level without using a deep neural network. It saves time not only during development but also during deployment. It is feasible to deploy this technique on an edge device very quickly. Deployment means when a solution is ready and deployed on a processing device, i.e., device 100 that is not dependent on any other service for decision-making. Due to the high computing complexity of an AI-based automated solution, processing has generally shifted to the cloud, which brings in many issues, some of which are noted above. Processing on the cloud refers to executing computational tasks, such as running applications, analyzing data, or performing calculations, using remote computing resources provided by a cloud service provider. Instead of relying solely on local computers or servers, processing on the cloud leverages the infrastructure and services offered by cloud platforms. When a hardware device depends on a cloud-based service, it increases the time it takes to complete an operation.

The systems and methods described herein depend on real-time operation, which requires less latency; however, on-cloud processing brings significant latency. The local network latency also adds to the time required to complete an operation. Further, there are more security issues. The cost of cloud services is another factor, as is the price of maintenance and scaling up.

Moreover, the systems and methods described herein can be entirely deterministic. Deterministic and probabilistic solutions represent two different approaches to problem-solving, especially in computer science.

Deterministic Solution: A deterministic solution is one where the outcome is entirely determined by the input and the algorithm or process used to solve the problem. In other words, given the same input under the same conditions, a deterministic solution will always produce the same result. There is no randomness or uncertainty involved in deterministic solutions. Examples of deterministic algorithms include sorting algorithms like merge sort or quicksort, where the output is predictable based on the input data and the algorithm's steps.

Probabilistic Solution: Conversely, a probabilistic solution involves randomness or probability in determining the outcome. Instead of producing a definite result, a probabilistic solution provides a probability distribution of possible outcomes. The outcome is not fixed and can vary each time the solution is executed, even with the same input and conditions. Probabilistic solutions are often used when randomness or uncertainty is inherent, such as in statistical modeling, machine learning algorithms like random forests, Monte Carlo simulations, or cryptographic protocols involving random keys.

A deterministic algorithm is crucial for robust automation because it ensures predictable and consistent behavior, which is essential for reliable and repeatable automated processes. In automation, deterministic algorithms guarantee that the same inputs always yield the same outputs, irrespective of the system's state or external conditions. This predictability is fundamental for maintaining control, accuracy, and reliability in automated systems, enabling them to perform tasks consistently and efficiently without unexpected variations or errors. A deterministic algorithm helps avoid mistakes and saves costs in industrial environments by ensuring consistent and predictable outcomes. When automated systems rely on deterministic algorithms, they can perform tasks with precision and accuracy, reducing the likelihood of errors or deviations from expected behavior. This consistency minimizes the need for manual interventions, rework, or corrective actions, thereby saving time and resources. In industries where errors can lead to downtime, defects, or safety hazards, the reliability offered by deterministic algorithms helps maintain productivity, quality, and operational efficiency, ultimately contributing to cost savings and improved performance.

Deep learning solutions exhibit probabilistic characteristics due to several inherent factors. The foundations of deep learning-based techniques are based upon principles of probability. The models start from randomness and progressively learn the distribution. First, during training, algorithms like stochastic gradient descent introduce randomness by using random mini-batches of data, leading to slightly different model updates in each iteration. This stochastic nature helps models explore a broader solution space and avoid getting stuck in local minima. Second, deep learning models often deal with noisy or ambiguous data, such as images with varying lighting conditions or natural language text with semantic nuances. This uncertainty in the data makes it challenging to make deterministic predictions, prompting deep learning models to output probabilities instead. Furthermore, many deep learning architectures employ activation functions like softmax in the output layer to convert raw model outputs into probability distributions. This allows the model to express its confidence level in different predictions, reflecting the inherent uncertainty in real-world data.

Probabilistic solutions are sometimes wrong, but they are helpful in some cases, such as predictive scenarios, e.g., disease or finance prediction. But in this case, the automation of a stroboscope is a type of automation that requires a deterministic solution that provides deterministic and repeatable results on identical inputs, as automation includes repetition of specific tasks. The determinism of the systems and methods described herein stems from its reliance on mathematical formulas and computations that are not influenced by randomness or probability. It calculates, as described below, the dense optical flow vectors for each pixel and computes even the minor change in pixel flow. To detect stroboscopic effects, its deterministic nature guarantees that the algorithm is applied it to the same video sequence multiple times or across different systems, the same detection results will be produced, aiding in the reliable and repeatable analysis of stroboscopic effects in videos.

Thus, again the systems and methods described herein use a deterministic approach, recognizing the necessity for precision in discerning the presence or absence of the stroboscopic effect. By scrutinizing the minute changes in optical flow between consecutive frames, the systems and methods described herein endeavor to offer a definitive verdict on the occurrence of this visual phenomenon. Through this lens, a solution and an understanding of the underlying mechanics driving the stroboscopic effect detection process is achieved in the form of optical flow change visualization.

FIG. 4 illustrates an algorithm process of a stroboscope 100, according to an embodiment. Process 400 may be implemented in software and/or hardware within device 100 and/or platform 1010. Further, multiple objects and calculations can be done at the same time. While process 400 is illustrated with a certain arrangement and ordering of subprocesses, process 400 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Thus, FIG. 4 illustrates an example of the overall process 400 for determining the stroboscope effect. Process 400 starts in step 410, where a video captured, e.g., with device 100 are presented to the AI processor 1110. Such AI algorithms can receive the initial frame of the video and convert it into grayscale, ensuring a uniform processing environment. Subsequently, it retrieves essential video properties, including frame width, height, and frames per second (fps), crucial for further analysis and visualization. The, e.g., AI algorithm(s) used herein can be configured to initialize a video writer object, facilitating the storage of subsequent visualizations and output data. Finally, counters are set for total frames processed and frames with stroboscopic effect.

Subprocess 420 illustrates a frame processing loop. To implement the AI algorithm(s) enters a loop to iterate through each frame until the end of the video is reached. Within the loop the AI can read the next frame and converts it to grayscale to simplify analysis. Using the Farneback method, as described above in FIG. 3, processor 1110 calculates the optical flow between the previous and current frames, then generates a visualization of the optical flow by drawing arrows on a black image, which represents the motion between frames. This visualization is written to the output video. Additionally, the magnitude of optical flow vectors are computed and the average magnitude to determine the intensity of motion is calculated. To detect the stroboscopic effect, the average magnitude is checked to see if it falls below a predefined threshold, typically set to 1.0. After processing each frame, the previous frame is updated for the next iteration. Finally, a check for user input ('q') is incorporated to allow for exiting the loop when desired, providing control over the process.

As previously described in FIG. 3, process 300 illustrates a process for calculating the optical flow between consecutive video frames. To calculate the percentage of frames with the stroboscopic effect, processor 1110 maintains a counter to track the number of frames detected with the effect. This counter is incremented whenever the average magnitude of optical flow vectors falls below the predefined threshold indicating the presence of the stroboscopic effect. Upon reaching the end of the video, processor 1110 calculates the percentage of frames with the stroboscopic effect by dividing the number of frames with the effect by the total number of frames processed and multiplying by 100. This percentage results are then displayed to the user in subprocess 430.

Subprocess 440 illustrates the visualization generation by the algorithm in processor 1110. By analyzing consecutive frames, processor 1110 can compute velocity vectors or flow directions, then employ cv2.arrowedLine to overlay arrows depicting these vectors onto each frame. Finally, processor 1110 can release the video capture and writer objects to free up system resources and close any remaining windows associated with the video processing.

2.4 Downstream Use

Once a strobostable state is achieved for the images, e.g., a systems under inspection 1102. This image is then passed onto an AI Model 1108 trained to detect required deviations and abnormalities by comparing the image with what can be termed a ground truth image. This allows this allows the systems and methods described herein to inspect fast-moving objects and check them automatically, which is a massive improvement over conventional stroboscopes and uses thereof, because human inspection is impossible due to the fast speeds of the system under inspection.

Figure 11:
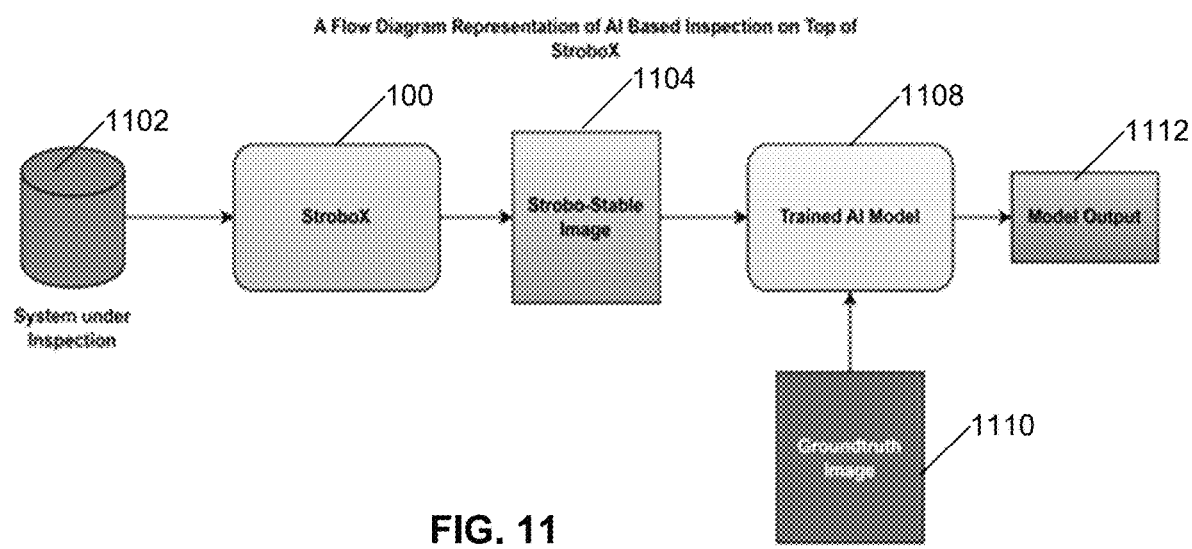
FIG. 11 illustrates a process for training an AI model for use in the systems and methods described herein in accordance with one embodiment.

Thus, as illustrated in FIG. 11, when a strobostable image 1104 is produced by device 100, as described above, then the image(s) can be passed to the model 1108, where is can be compared to a ground truth image 1110, and an output 1112 can be produced that can be indicative of an issue, such as a crack in a fan, with the system or component 1102 under inspection.

As noted above, certain embodiments can make use of Super-Resolution Generative Adversarial Networks (SR-GANs) for AI Model 1108, which is a cutting-edge approach to enhancing image resolution using deep learning techniques. SRGANs leverage the power of Generative Adversarial Networks (GANs), a type of neural network architecture consisting of two components: a generator and a discriminator. In other words, applications 1032 and/or 1012 can incorporate one or more SRGAN's to enable a processor(s) in user system 1030 and/or platform 1012 to increase the resolution of images, e.g., according to the process outlined below.

First, a generator network in an SRGAN transforms low-resolution images into high-resolution versions. The generator network achieves this by learning complex mappings between low-resolution and high-resolution image spaces during training. Thus, the generator takes a low-resolution input image and applies a series of transformations to up-sample it to a higher resolution while preserving or enhancing image details.

Then, a discriminator network in an SRGAN acts as a critic that evaluates the high-resolution images produced by the generator. Its role is to distinguish between real high-resolution photos and the high-resolution images generated by the generator. The discriminator provides feedback to the generator, guiding it to produce more realistic and high-quality outputs over time.

The training process of an SRGAN involves adversarial training, where the generator and discriminator networks compete against each other. This competition drives the generator to improve its ability to generate high-resolution images in-distinguishable from authentic high-resolution images. The generator aims to "fool" the discriminator into accepting its generated images as authentic.

The SRGANs use multiple loss functions to train both the generator and discriminator networks effectively: 1. Adversarial Loss: This loss function guides the generator to produce high-resolution images visually similar to real high-resolution images, fooling the discriminator. 2. Perceptual Loss: SRGANs incorporate perceptual loss, which measures the difference in features between the generated high-resolution images and the authentic high-resolution images. It ensures that the generated images look realistic and capture important visual characteristics and details. 3. Content Loss: Content loss focuses on preserving important content and structure from the low-resolution input images in the generated high-resolution photos. This helps maintain consistency and fidelity between the input and output images.

To increase image resolution, SRGANs employ sophisticated up-sampling techniques such as transposed convolutions, also known as deconvolutions. These techniques effectively interpolate pixel values to create higher-resolution versions of input images. Additionally, SRGANs can use skip connections or residual blocks to facilitate information flow and enhance the generation of fine details. During training, SRGANs progressively improve as the generator learns to generate increasingly realistic, high-quality, high-resolution images. The discriminator feedback helps the generator refine its output, leading to visually pleasing results with enhanced resolution, sharpness, and detail.

SRGANs offer several benefits in increasing image resolution: Detail Enhancement: SRGANs capture fine details and textures, producing high-resolution images with enhanced clarity and sharpness; Realism: The adversarial training process ensures that the generated high-resolution images closely resemble authentic high-resolution images, pro-viding a realistic and natural appearance; Artifact Reduction: SRGANs mitigate common artifacts such as blurring or pixelation often associated with traditional upscaling methods, producing smoother and more visually appealing results; Versatility: SRGANs can be applied across various domains, including photography, medical imaging, satellite imagery, and digital art, demon-strating their versatility and utility in enhancing image resolution.

In summary, SRGANs leverage adversarial training, advanced loss functions, up-sampling techniques, and profound learning principles to increase image resolution effectively. Through the collaboration of the generator and discriminator networks, SRGANs produce high-quality, realistic, and detail-rich high-resolution images, making them a state-of-the-art approach in image resolution enhancement.

2.5 Training Using Generative AI

Generative Artificial Intelligence can be used for synthetic data generation to train and test deep machine learning models that can then be sued for AI model(s) 1108, such as described above. Once the stroboscopic effect is reached, the data (images) captured in a stable state is a valuable asset, as noted. These stationary-like stable images of fast-moving objects can be used for various inspection and monitoring applications; however, it is essential to note that these deep machine-learning models require much data for training and testing. To train robust machine learning models, additional synthetic data can be generated for downstream tasks using Generative AI.

Deep neural networks (DNNs) have revolutionized various fields through their ability to learn complex patterns from large datasets. This transformation is particularly evident in applications requiring intricate pattern recognition, such as visual inspection algorithms used in manufacturing and quality control. The training process of DNNs and the augmentation of training data using synthetic data generated by generative AI can be crucial for enhancing the performance and robustness of these algorithms.

The initial step in training a deep neural network involves collecting a substantial amount of data relevant to the task. For visual inspection algorithms, this data can include images of products, components, or defects. This raw data often needs preprocessing, which includes normalization, resizing, and possibly converting it to a format suitable for the neural network. Each data point must be labeled accurately to provide the supervised learning framework necessary for training. In the case of inspection algorithms, labels might indicate whether an image contains a defect, the type of defect, or its location. Accurate labeling is essential as it directly influences the network's ability to learn and generalize Choosing an appropriate neural network architecture is crucial. Common architectures include Convolutional Neural Networks (CNNs) for image-related tasks. The architecture defines how many layers the network will have, the type of layers (convolutional, pooling, fully connected), and how these layers are interconnected. During training, the labeled dataset is fed into the network, which adjusts its internal parameters (weights and biases) to minimize the error in its predictions. This process involves multiple epochs where the entire dataset is repeatedly passed through the network. Techniques like backpropagation and optimization algorithms such as Stochastic Gradient Descent (SGD) are employed to iteratively refine the model. The trained model is then validated on a separate dataset not seen during training to evaluate its performance. This helps in tuning hyperparameters and avoiding overfitting. Finally, the model is tested on another unseen dataset to assess its generalization ability.

Data augmentation in deep learning is a technique used to increase the size and diversity of a training dataset artificially. This is crucial because deep learning models, particularly deep neural networks, perform better when trained on large and varied datasets. Data augmentation involves creating new training examples by applying various transformations to the original data. For instance, in the context of image data, this could include rotating the image, flipping it horizontally or vertically, cropping different sections, adjusting the brightness or contrast, and adding noise. These transformations help the model learn to recognize objects or patterns from various perspectives and under varying conditions, which improves its ability to generalize when making predictions on new, unseen data. The idea is that presenting the model with slightly altered versions of the same image becomes more robust and less likely to overfit. It won't just memorize the training data but will instead learn the underlying features that define each class. This is particularly important in applications like visual inspection, where defects might appear in different forms and under various lighting conditions, so the model needs to be flexible and accurate in its recognition capabilities.

High-quality, labeled data can be scarce, especially for rare defects in inspection algorithms. Data augmentation addresses this issue by artificially increasing the dataset size, improving the network's robustness and generalization. Conventional data augmentation methods include transformations such as rotation, scaling, flipping, and adding noise to existing images. While these methods can effectively expand the dataset, they might not always capture the variability and complexity needed for specific applications.

Networks (GANs) (described in detail below) and Variational Autoencoders (VAEs), can create highly realistic synthetic data that mimics the real-world variations seen in inspection tasks. These networks learn the underlying distribution of the training data and generate new samples that augment the original dataset. The benefits of synthetic data are manifold. It increases data diversity, generating diverse examples, including rare defects, and enhancing the network's ability to handle real-world scenarios. It also helps balance the dataset by producing additional samples for underrepresented classes, reducing bias. Moreover, synthetic data generation can be less costly and time-consuming than collecting and labeling new real-world data. Integrating synthetic data into the training pipeline involves combining it with real-time data to form a more comprehensive training set. This approach can significantly improve the performance of inspection algorithms by providing a richer set of examples for the network to learn from.

In the context of inspection algorithms, the benefits of synthetic data augmentation are profound. Inspection systems often need to identify minute defects in a high-volume manufacturing environment, where defect data can be rare and varied. By augmenting the dataset with synthetic images of potential defects, the network can learn to identify these defects more accurately, even if they are rare in the real-world dataset. The variability introduced by synthetic data helps the network generalize better to unseen data, reducing the likelihood of false positives and false negatives in real-world applications. Synthetic data allows for quicker iteration and refinement of inspection algorithms. Instead of waiting for sufficient real-world defect data, generative AI can produce the necessary examples to continue training and improving the model.

The training of deep neural networks is a complex process that heavily relies on data availability and quality. In fields such as visual inspection, where defect data can be scarce and varied, synthetic data augmentation using generative AI offers a powerful solution. By enhancing data diversity and balancing datasets, synthetic data improves the robustness and accuracy of inspection algorithms and accelerates their development and deployment. This integration of generative AI into the data augmentation process represents a significant advancement in machine learning, enabling more reliable and efficient automated inspection systems.

Deep neural networks (DNNs) are powerful tools for solving complex tasks such as image recognition, natural language processing, and game playing. The performance of these models heavily depends on the quality, quantity, and diversity of the data used for training. Data is the foundational element enabling neural networks to learn patterns, make predictions, and generalize to new, unseen examples.

Accuracy and Relevance: High-quality data must be accurate and relevant to the task. Errors or irrelevant data can lead to incorrect model training, causing the network to learn incorrect patterns.

Label Accuracy: Accurately labeled data is crucial for supervised learning. Mislabeling can confuse the model and degrade its performance.

Volume Matters: More data typically leads to better model performance. Large datasets allow DNNs to capture a wider array of patterns and variations, reducing the risk of overfitting.

Coverage of Edge Cases: A large dataset increases the likelihood of including rare but important scenarios, making the model more robust.

Variety in Features: Diverse data ensures the model learns to generalize across different conditions and scenarios. For instance, an image recognition model trained on diverse images (different lighting, angles, and backgrounds) performs better in real-world applications.

Mitigating Bias: Diversity helps mitigate biases in the data, leading to fairer and more equitable models. Models trained on non-diverse data can inherit and even amplify existing biases.

A model must be trained on data representing the full spectrum of scenarios it might encounter to achieve robustness and generalization. This involves ensuring:

Comprehensive Representation: Training data should cover all relevant aspects of the problem domain.

Balanced Classes: In classification tasks, ensuring that all classes are well-represented prevents the model from being biased towards more frequent classes.

Augmented Data: Data augmentation techniques such as rotation, scaling, and flipping can artificially increase dataset diversity, helping the model generalize better.

Despite the critical importance of data, acquiring high-quality datasets is often a significant bottleneck:

1. Collection Challenges:
   Cost and Resources: Gathering large, high-quality datasets can be expensive and time-consuming.
   Accessibility: Some data types, like medical records or proprietary business data, are difficult to access due to privacy and security con-cerns.
2. Annotation and Labeling:
   Human Effort: Accurate labeling requires substantial human effort, which is labor-intensive and prone to errors.
   Expertise Required: Certain datasets require domain-specific knowl-edge for accurate labeling, increasing costs.
3. Data Privacy and Ethics:
   Regulations: Compliance with data privacy regulations like GDPR can limit the availability and usability of data.
   Ethical Concerns: Ethical considerations around data usage, such as consent and bias, add another layer of complexity.

Figure 8:
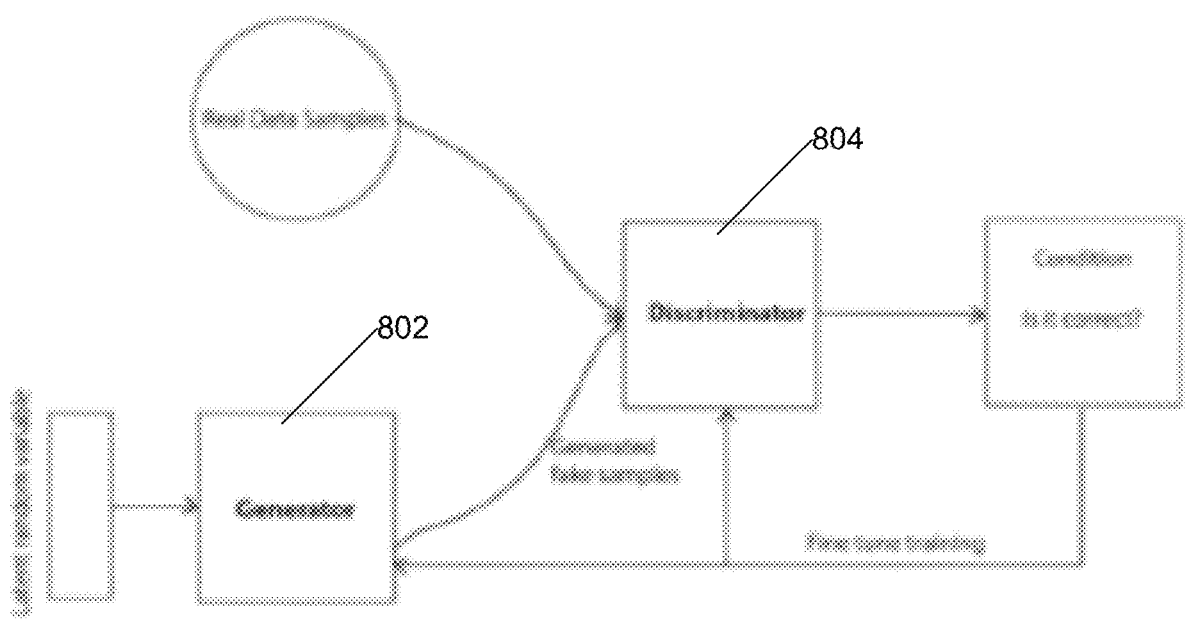
FIG. 8 illustrates a Generative Adversarial Networks (GANs) that can be used to train an AI that can be used in the device of FIG. 1.

Generative Adversarial Networks (GANs) are a sophisticated type of neural network architecture designed for creating synthetic data. Comprising a generator 802 and a discriminator 804, as illustrated in FIG. 8, they function cyclically. Initially, both components start with random weights. The generator 802 takes random noise, typically from a normal distribution, and transforms it into synthetic data. Initially, these out-puts lack meaning due to the random nature of the generator's weights. On the other hand, the discriminator 804 is tasked with distinguishing between accurate data from the actual dataset and synthetic data generated by the generator 802.

During the training phase, the discriminator 804 is trained first. It learns to correctly classify natural and synthetic data through backpropagation and gradient descent. Following this, the generator 802 is trained using the feedback from the discriminator. The goal is for the generator 802 to produce synthetic data that is indistinguishable from accurate data, fooling the discriminator 804 into categorizing it as real. This adversarial training continues, with the discriminator and generator 802 improving their abilities. As training progresses, the generator 802 becomes adept at creating realistic synthetic data, while the discriminator 804 enhances its capability to differentiate between natural and synthetic samples. Eventually, they reach a convergence point where the generator 802 produces synthetic data statistically similar to accurate data, and the discriminator 804 can't reliably tell them apart. After training, the generator 802 can generate new synthetic data by inputting random noise vectors. This synthetic data can be invaluable for augmenting datasets, addressing data scarcity, or creating diverse training scenarios for machine learning models. This equation represents the objective function of a Generative Adversarial Network (GAN).

$$\min_G \max_D E_{x \sim p_{data}(x)}[\log D(x)] + E_{z \sim p_x(z)}[1 - \log D(G(z))] \quad (2)$$

minG maxD: This indicates the objective to minimize the function with respect to the Generator G and maximize it with respect to the Discrim-inator D.

Ex~pdata(x)[log D(x)]: This term represents the expected value of the log probability that the Discriminator correctly classifies real data samples x as real.

x~pdata(x): x is drawn from the real data distribution pdata(x).

log D (x): The logarithm of the Discriminator's output when given a real data sample x.

Ez~pz(z)[1–log D(G(z))]: This term represents the expected value of the log probability that the Discriminator classifies generated data samples G(z) as fake.

z·pz(z): z is drawn from the latent space distribution pz(z).

G(z): The data sample generated by the Generator G from the latent variable z.

1–log D(G(z)): Represents the Discriminator's classification error for the generated sample G(z).

The Generator G aims to generate data that maximizes the Discriminator's classification error (making D(G(z)) approach 1). In contrast, the Discriminator D aims to accurately distinguish between real data and data generated by G. The equilibrium of this min-max game is achieved when G generates data that D cannot distinguish from real data, leading to realistic data generation.

Data is crucial in training machine learning models, particularly in specialized applications such as crack detection and inspection algorithms. These fields often encounter rare cases or situations where anomalies are infrequent yet vital to identify accurately. The importance of data, scarce case data, for model training is highlighted, alongside challenges related to continuous data collection and the role of synthetic data generation, mainly through GenAI, in addressing these challenges. Rare case data is imperative for model training, especially in crack detection and anomaly inspection tasks. Models must be exposed to various scenarios, including rare occurrences, to ensure their robustness and accuracy in real-world deployments. For instance, a model trained solely on common crack patterns might struggle with unusual formations, underlining the necessity of incorporating rare case data into the training process.

Continuous data collection faces significant hurdles when gathering sufficient data for rare cases. These scenarios occur infrequently, making relying solely on constant data collection efforts impractical. Furthermore, ethical or practical constraints in domains like industrial inspections or medical diagnostics can further hinder access to rare cases. As a result, depending solely on real-world data collection may not be adequate for comprehensive model training. Synthetic data generation, facilitated by techniques like Generative Adversarial Networks (GANs) and platforms such as GenAI, offers a promising solution to the limitations of continuous data collection for rare cases by creating realistic yet artificial data that simulates rare scenarios. Synthetic data supplements existing datasets and ensures that models are exposed to diverse situations, including those that occur infrequently in practice. This approach significantly enhances model performance and generalizability, particularly in identifying and accurately classifying rare anomalies during deployment.

GenAI's role in data generation is crucial, as it combines advanced algorithms with domain knowledge to create synthetic data that closely mimics real-world scenarios. For instance, GenAI can generate images or sensor data representing rare crack patterns in crack detection, enabling models to learn and generalize better. This approach benefits model performance by improving accuracy, reducing dependency on real-world data collection, creating versatile training scenarios, and addressing ethical considerations in acquiring rare data. In conclusion, while data is essential for training machine learning models, the need for rare case data cannot always be met through continuous data collection alone. Synthetic data generation, primarily through advanced techniques like GenAI, fills this gap by providing realistic yet artificial data that enhances model performance, scalability, and versatility in handling rare scenarios. This ultimately contributes to the development of more reliable and robust AI systems.

3. General Applicability and Functionalities

Figure 9:
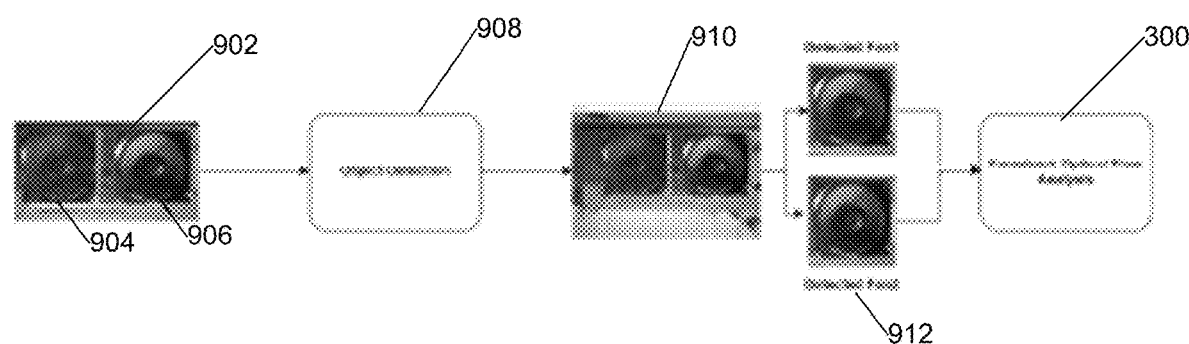
FIGS. 9 and 10 illustrate a process to identify multiple objects in a sequence of video frames acquired using the device of FIG. 1.
Figure 10:
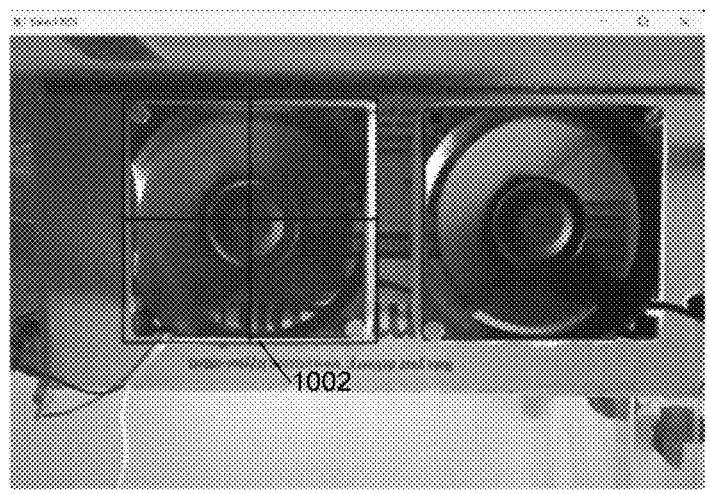

In certain embodiments, device 100 can handle inspection of multiple devices with n number of devices in the frame. For example, the process in FIG. 9 illustrates a frame 902 with more than one fan 904 and 906. Device 100 and or platform 1012 can be configured to use an object detection algorithm to detect each fan 904 and 906 in the image 902 and returns the coordinates (1002 in FIG. 10) for the boundary of each object (fan) 904 and 906 in step 908. Now, having the coordinates to each fan 904 and 906, these are passed as input to the stroboscopic detection function along with the video in steps 910 and 912. The stroboscopic effect detection module or algorithm is designed so that, given the localization parameters of each object 904 and 906, the optical flow analysis on each detected region will be evaluated separately (912) throughout the video. Moreover, the visualization of change in dense optical flow (300) is also performed independently, Thus in real-time, dynamically each fan is detected and processed, so this is the reason there is no limit on the number of fans in the video. The object detection algorithm returns the parameters in the format X1, Y1, Width, and Height. X1 and Y1 refer to the top left coordinates of the detected region on the pixel grid.

Thus, the input frame 902 contains two fans 904 and 906, the image is passed as input to the object detection engine in step 908, the object detection engine detects each fan in the frame, and passes each frame for analysis (910 and 912) to the Farneback engine.

This section outlines the training plan for developing an object detection engine that identifies multiple fans within a frame. The approach encompasses several key phases. First, a diverse dataset is curated, comprising images or videos capturing environments where fans are prevalent, ensuring coverage of different lighting conditions, angles, distances, and occlusions to mimic real-world scenarios accurately. Subsequently, the collected data is meticulously annotated with bounding boxes around each fan, employing precise labeling methods to facilitate practical model training. Data pre-processing techniques, including rotation, scaling, flipping, and noise addition, are applied to augment dataset diversity, followed by normalization to ensure consistency in color and contrast for improved feature extraction. Model selection involves choosing an appropriate architecture, considering factors like performance, computational efficiency, and model size. The selected model is then trained, leveraging pre-trained weights from datasets like COCO and utilizing techniques such as transfer learning, with GPU acceleration expediting the process, especially for deep neural network architectures: hyperparameter tuning and continuous monitoring of training metrics guide optimization efforts, ensuring convergence and performance assessment. Evaluation of the trained model involves assessing accuracy and generalization ability using validation sets complemented by quantitative metrics and qualitative analysis. Iterative improvement incorporates feedback from evaluation results and real-world deployment scenarios to refine the training process further. Finally, deployment entails ensuring compatibility with the target application environment, implementing post-processing techniques like non-maximum suppression, and continuously updating the deployed model to adapt to evolving conditions, aiming for high accuracy and reliability in fan detection across diverse real-world scenarios.

Further, the systems and methods described herein can allow readings of a single or multiple devices at the same time. As an example, a system configured as described herein can analyze the speed of moving part whether it is a fan or paper roll or any other vibration in single or in multiples. In fact, even if there are, e.g., five fans running at different speeds being close physically to each other on the same frame, the disclosed systems and methods can detect the revolutions per minute (RPM) for each one separately and/or together.

Moreover, the systems and methods described herein can be used to declare a stroboscopic event based on blurred images if the stroboscope 100 cannot reach a clear image due to poor environmental conditions, LED lights or distance. Such systems for automated detection of the stroboscopic effect can assist in enhancing stroboscopic events with blurred images by employing advanced image processing algorithms. Further, the systems and methods described herein can be configured to infer the underlying structures and patterns, effectively restoring the details and clarity of the stroboscopic event, thus providing valuable insights even in challenging conditions y analyzing multiple blurry frames and leveraging machine learning models.

Integrating AI, as described above enhances stroboscopic event detection and mechanical issue identification. Traditionally, stroboscopes rely on fixed duty cycles, typically ranging from 1% to 10%. However, with dynamic duty cycle switching, the systems described herein for automated detection of the stroboscopic effect can adapt to various scenarios, optimizing event determination even amidst challenging conditions. Furthermore, manual stroboscopes are limited in their ability to predict mechanical issues. A stroboscope, equipped with AI, as described herein, offers a proactive solution by enabling permanent placement over weak areas, predicting and preventing potential faults before they occur, thus enhancing operational reliability.

The systems and methods described herein provide stroboscope 100 with enhanced data analysis capabilities, transcending the subjective limitations of traditional methods. The automation based in AI reduces reliance on operator skill and interpretation bias. Additionally, automated monitoring facilitated by AI ensures continuous data collection, capturing transient issues and subtle changes in machine behavior often overlooked during intermittent inspections. Predictive analytics further augments the capabilities described herein, leveraging historical and real-time data to forecast future failures accurately, thereby optimizing maintenance schedules and minimizing unplanned downtime.

The systems and methods described herein simplify complex data interpretation, democratizing access beyond skilled operators to a broader user base through a user-friendly interface, made possible by the AI system. In addition, environmental adaptability ensures effectiveness across diverse settings, while safety improvements, such as automated and remote monitoring, mitigate risks associated with close proximity to moving machinery. Finally, the systems and methods described herein can be integrated with other predictive maintenance tools to offer a comprehensive maintenance strategy and fostering a holistic approach to equipment health monitoring and management.

As described herein, an AI-based system for automated detection of the stroboscopic effect, a stroboscope integrates advanced AI technology to address various challenges inherent in manual stroboscopes. The systems and methods described herein significantly reduce human errors by minimizing human intervention. An AI-based system for automated detection of the stroboscopic effect ensures unparalleled consistency and accuracy in readings and analysis, free from subjective errors. The continuous monitoring capability described herein enables the detection of transient issues and changes in machine behavior that might go unnoticed between manual inspections, enhancing predictive maintenance strategies.

Moreover, the power of data-driven insights can now be tapped by collecting and analyzing vast amounts of data over time, offering valuable predictive analytics beyond intermittent manual inspections. By having user-friendly automation, the present invention simplifies the process and makes predictive maintenance accessible to facilities without specialized skills or extensive training. As a collateral benefit, safety is also prioritized as the present invention minimizes direct operator interaction with machinery, reducing exposure to hazardous environments.

Real-time alerts and notifications provided by the present invention enable swift responses to potential issues, preventing equipment failure. A stroboscope with an AI-based system for automated detection of the stroboscopic effect can adapt to various operating conditions and seamless integration with other predictive maintenance tools offer a comprehensive approach to equipment health monitoring. Further, the solution's dense pixel-level detection ensures even the slightest movement in machinery is detected, while its deterministic decision-making guarantees real-time identification of the stroboscopic effect.

Another benefit is the lightweight, fast, and efficient design of device 100, coupled with its contactless operation. By having a contactless operation, a stroboscope with an AI-based system for automated detection of the stroboscopic effect ensures minimal disruption to the systems under inspection. Furthermore, the lack of bias towards specific deployment conditions or visual features enhances its generalizability across diverse environments and deployment conditions.

In general, the systems and methods described herein provide numerous industrial applications, showcasing its versatility and effectiveness as a system for automated detection of the stroboscopic effect and then AI assisted analysis of various systems and processes. Key examples include its seamless integration into manufacturing processes for enhanced efficiency, optimizing preventive maintenance, and quality control to ensure stringent standards are met. However, it's crucial to note that these instances merely exemplify rather than restrict the breadth of the systems and methods described herein.

For example, the systems and methods described herein can improve a process for pipe vibration analysis for leak detection and prevention, by providing a non-contact, non-invasive solution for water flow/leaks detection. Using AI algorithms, as described above, the systems and methods described herein can be used to predict areas at risk, allowing for targeted inspections and repairs, thus preventing environmental damage and ensuring uninterrupted flow in oil, gas, and water distribution networks. Another benefit of using the systems and methods described herein for vibration analysis for leak prevention is that such systems can be configured to operate externally and do not require any insertion into the pipe, offering a non-invasive solution to flow measurement, which is less disruptive and easier to implement across various industries. Identifying unusual flow patterns or vibrations indicative of leaks, enables preemptive repairs, reducing water loss and preventing larger breaks that could disrupt water supply and cause significant damage.

Another significant application is the improvement of precision lathe operations in metalworking. In metalworking shops, a system for automated detection of the stroboscopic effect can enhance the precision operation of lathes by monitoring for vibrations or irregular movements that could affect product quality. The AI-driven analysis describes herein helps maintain the accuracy of machining processes, crucial for producing high-quality parts with tight tolerances. The prompt detection of irregularities can further prevent quality deviations, which regularly can encompass millimetric differences that cannot be detected with other types of technology.

In addition to the previous applications, another application is the automation of the inspection of automotive brake rotors on production lines, detecting microscopic cracks or uneven wear through stroboscopic imaging. Through an AI-driven analysis, the systems and methods described herein can be used to identify defects that could lead to brake failure, ensuring vehicle safety and reducing manufacturer liability. Further, the systems and methods described herein can be used to check for alignment and uniformity in moving assembly lines, ensuring that each vehicle component is correctly installed and functioning. For vehicles in use, the systems and methods can be configured to monitor engine components as they operate, detecting unusual vibrations that indicate misalignments, wear, or imbalances. This helps in maintaining engine efficiency and extending vehicle lifespan by identifying issues that require immediate attention.

Another type of application that can make use of the systems and methods described herein is large printing operations and metal sheet rolling. One of the main steps in creating sheet metal is rolling, during which long and wide metal sheets are passed through a set of rollers to reduce the sheet thickness and achieve a very thin, uniform thickness throughout. The metal is deformed along the linear axis by compressive stress. After the rolling, the metal sheets may go through annealing, which is a heat treatment process that improves the ductility and hardness of the metal.

But the process is prone to inducing defects in the metal sheets, once the defect begins it is propagated through the rest of the sheet. Currently, the sheets must therefore be inspected after the rolling process, yet as many as 1 out 5 sheet roles are returned by client. The inspection process is expensive enough, but not sufficient therefore to prevent costly returns. Stroboscopes have been used to try and detect defects closer to in real-time, but it requires someone to "hover" over the sheets as they are being rolled in order to control a conventional stroboscope and detect defects. Large printing processes, such as large label printing processes can suffer from similar issues.

But the systems and methods described herein can be deployed in such systems to automatically detect defects in real-time and without the safety issues.

The systems and methods described herein provide a new alternative for diverse industries, revolutionizing operations and ensuring unparalleled precision and safety standards. In textile machinery thread tension control, the system for automated detection of the stroboscopic effect combined with an AI-technology can optimize yarn tension, enhancing product quality and reducing material waste. Further, elevator mechanism safety inspections can benefit from monitoring crucial parameters in real-time. Finally, Large-Scale 3D printer calibration can rely on the present invention to fine-tune printing parameters, ensuring precision and the production of high-quality components across various applications. In each of these industries, the system for automated detection of the stroboscopic effect not only improves operational efficiency but also elevates safety standards and product quality to unprecedented levels.

The above description is provided to enable any person skilled in the art to make or use the systems and methods described herein. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A stroboscopic device, comprising:
a camera for acquiring video frames;
a light source; and
at least one hardware processor; and
software that is configured to, when executed by the at least one hardware processor,
acquire a sequence of video frames via the camera,
convert the frames from RGB to grayscale,
for a first and second frame in the sequence of video frames, compute the dense optical flow field between the two frames, wherein the optical flow field contains a flow vector for each pixel in each of the first and second frames, indicating the motion of that pixel from the first frame to the second frame,
calculate the average magnitude (Average Optical Flow or AOF) of all flow vectors for each pixel in the first and second frames,
compare the AOF to a threshold, and store a result based on the comparison,
repeat the process for all frames in the sequence of video frames,
determine whether a stroboscopic effect has been achieved based on the store results,
control the activation of the light source until the results indicate that the stroboscopic effect has been achieved, and
obtain a further sequence of video frames after the stroboscopic effect is achieved,
identify an object in the further sequence of video frames, and
automatically detect movement or vibration of the identified object.

2. The device of claim 1, wherein the results are saved as a of positive or negative, and it is determined that the stroboscopic effect is achieved when the positive results exceed a second threshold.

3. The device of claim 2, wherein the second threshold is 95%.

4. The device of claim 1, wherein the light source is an LED light source.

5. The device of claim 1, wherein converting the RGB image into a grayscale image comprising assigning weights to each of Red, Green, and Blue aspects of the RGB image, wherein weights are chosen to match the human perception of brightness, generate a weighted sum weighted sum for the Red, Green, and Blue aspects, wherein the weighted sum represents a grayscale pixel value.

6. The device of claim 1, wherein the Farneback algorithm is used to determine the optical flow field.

7. The method of claim 1, wherein the software is further configured to, when executed by the at least one hardware processor, generate visualizations of the optical flow field.

8. The method of claim 1, wherein the software is further configured to, when executed by the at least one hardware processor, identify multiple objects in the further sequence of video frames, and automatically detect movement or vibration for each of the identified objects.

9. The method of claim 1, wherein identifying an object in the further sequence of video frames and detecting movement or vibration comprises passing the further sequence of video frames to a model.

10. The method of claim 9, wherein in the model comprises a Super-Resolution Generative Adversarial Networks (SRGANs).

11. A stroboscopic device, comprising:
a camera for acquiring video frames;
a light source; and
at least one hardware processor; and
software that is configured to, when executed by the at least one hardware processor,
acquire a sequence of video frames via the camera,
convert the frames from RGB to grayscale,
for a first and second frame in the sequence of video frames, compute the dense optical flow field between the two frames, wherein the optical flow field contains a flow vector for each pixel in each of the first and second frames, indicating the motion of that pixel from the first frame to the second frame,
calculate the average magnitude (Average Optical Flow or AOF) of all flow vectors for each pixel in the first and second frames,
compare the AOF to a threshold, and store a result based on the comparison,
repeat the process for all frames in the sequence of video frames,
determine whether a stroboscopic effect has been achieved based on the store results,
control the activation of the light source until the results indicate that the stroboscopic effect has been achieved, and
obtain a further sequence of video frames after the stroboscopic effect is achieved,
identify an object in the further sequence of video frames, and
automatically detect movement or vibration of the identified object, wherein identifying an object in the further sequence of video frames and detecting movement or vibration comprises passing the further sequence of video frames to a model.

12. The device of claim 11, wherein the results are saved as a of positive or negative, and it is determined that the stroboscopic effect is achieved when the positive results exceed a second threshold.

13. The device of claim 12, wherein the second threshold is 95%.

14. The device of claim 11, wherein the light source is an LED light source.

15. The device of claim 11, wherein converting the RGB image into a grayscale image comprising assigning weights to each of Red, Green, and Blue aspects of the RGB image, wherein weights are chosen to match the human perception of brightness, generate a weighted sum weighted sum for the Red, Green, and Blue aspects, wherein the weighted sum represents a grayscale pixel value.

16. The device of claim 11, wherein the Farneback algorithm is used to determine the optical flow field.

17. The method of claim 11, wherein the software is further configured to, when executed by the at least one hardware processor, generate visualizations of the optical flow field.

18. The method of claim 11, wherein the software is further configured to, when executed by the at least one hardware processor, identify multiple objects in the further sequence of video frames, and automatically detect movement or vibration for each of the identified objects.

19. The method of claim 18, wherein in the model comprises a Super-Resolution Generative Adversarial Networks (SRGANs).

* * * * *